United States Patent [19]
McCabe

[11] Patent Number: 6,039,533
[45] Date of Patent: *Mar. 21, 2000

[54] FAN BLADE, STRUCTURES AND METHODS

[76] Inventor: Francis J. McCabe, #6 Bunker Hill Rd., Ottsville, Pa.

[*] Notice: This patent is subject to a terminal disclaimer.

[21] Appl. No.: 09/008,042

[22] Filed: Jan. 16, 1998

Related U.S. Application Data

[63] Continuation-in-part of application No. 08/685,134, Jul. 24, 1996, Pat. No. 5,711,653, which is a continuation-in-part of application No. 08/507,129, Jul. 31, 1995, Pat. No. 5,599,172, and a continuation-in-part of application No. 08/990,201, Dec. 13, 1997.

[51] Int. Cl.[7] ............................ F04D 29/38; F04D 25/10
[52] U.S. Cl. ......................... 415/146; 415/147; 415/150; 415/157; 416/223 R; 416/228; 416/237; 454/353
[58] Field of Search ................................ 416/235, 236 R, 416/237, 223 R, 228, 197 R, 197 A, 197 B, 23, 24, 132 R, 132 B, DIG. 5; 244/198, 218; 415/148, 150, 151, 157, 158, 146, 147; 454/350, 351, 353

[56] References Cited

U.S. PATENT DOCUMENTS

| | | |
|---|---|---|
| 1,025,428 | 5/1912 | Stanschus . |
| 1,508,086 | 9/1924 | Crawford ................................ 416/237 |
| 1,818,607 | 8/1931 | Campbell ................................ 416/237 |
| 2,004,853 | 6/1935 | Crary . |
| 2,213,497 | 9/1940 | Kelly ................................... 416/236 R |
| 2,906,349 | 9/1959 | Hans et al. ............................... 416/237 |
| 3,807,663 | 4/1974 | Bartoe . |
| 3,827,482 | 8/1974 | Pope ................................... 416/236 R |
| 3,910,531 | 10/1975 | Leomand . |
| 4,021,135 | 5/1977 | Pedersen et al. . |
| 4,055,950 | 11/1977 | Grossman . |
| 4,075,500 | 2/1978 | Oman et al. . |
| 4,080,100 | 3/1978 | McNeese . |
| 4,132,499 | 1/1979 | Igra . |
| 4,140,433 | 2/1979 | Eckel . |
| 4,143,992 | 3/1979 | Crook . |
| 4,191,506 | 3/1980 | Packham ................................ 416/237 |
| 4,204,799 | 5/1980 | deGeus . |
| 4,236,083 | 11/1980 | Kenney . |
| 4,324,985 | 4/1982 | Oman . |
| 4,447,738 | 5/1984 | Allison . |
| 4,655,122 | 4/1987 | McCabe ................................ 454/353 |
| 4,720,640 | 1/1988 | Anderson et al. . |
| 4,784,570 | 11/1988 | Bond . |
| 4,859,140 | 8/1989 | Passadore ............................... 415/157 |
| 5,332,354 | 7/1994 | Lamont . |
| 5,457,346 | 10/1995 | Blumberg . |
| 5,599,172 | 2/1997 | McCabe ................................ 417/334 |
| 5,711,653 | 1/1998 | McCabe ................................ 416/237 |
| 5,827,044 | 10/1998 | Yazici et al. ............................ 415/150 |

FOREIGN PATENT DOCUMENTS

| | | |
|---|---|---|
| 365045 | 9/1906 | France . |
| 3606549 | 9/1987 | Germany ............................. 416/132 B |
| 39960 | 1/1937 | Netherlands . |
| 407633 | 3/1934 | United Kingdom . |
| 643237 | 9/1950 | United Kingdom . |
| 1410175 | 10/1975 | United Kingdom ............. 416/DIG. 5 |
| 2036193 | 6/1980 | United Kingdom . |
| 2068472 | 8/1981 | United Kingdom . |
| 2175963 | 12/1986 | United Kingdom . |
| 8100286 | 2/1981 | WIPO . |
| 9201866 | 2/1992 | WIPO . |

OTHER PUBLICATIONS

Kentfield & Clavelle, "The Flow Physics of Gurney Flaps, Devices for Improving Turbine Blade Performance," (1993), pp. 24–34, 17 Wind Engineering #1, Brentwood, Essex GB.
Gurney flap illustrations on automobile chassis (No Date).

*Primary Examiner*—Christopher Verdier
*Attorney, Agent, or Firm*—Frank J. Benasutti

[57] ABSTRACT

An aerodynamic-shaped fan blade for use in a fan apparatus. The blade has a cross-section which is essentially an inverted pan-shape with an intermediate section, a leading edge section, and a trailing edge section which form concave and convex surfaces. The trailing edge has a flange doubled back toward the leading edge within the concave envelope.

13 Claims, 29 Drawing Sheets

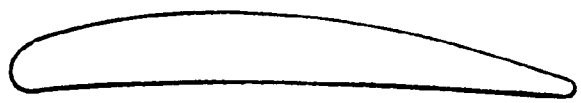
FIG. 1A PRIOR ART
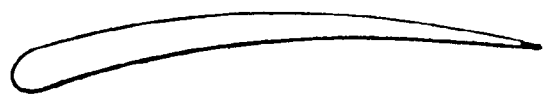
FIG. 1B PRIOR ART
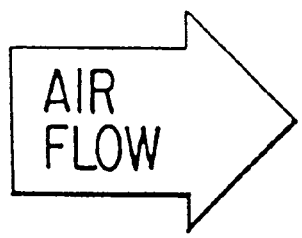 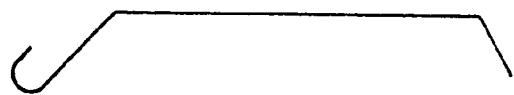
FIG. 1C PRIOR ART
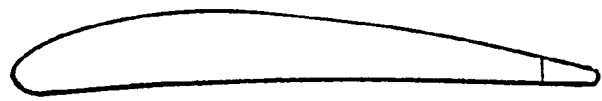
FIG. 1D PRIOR ART

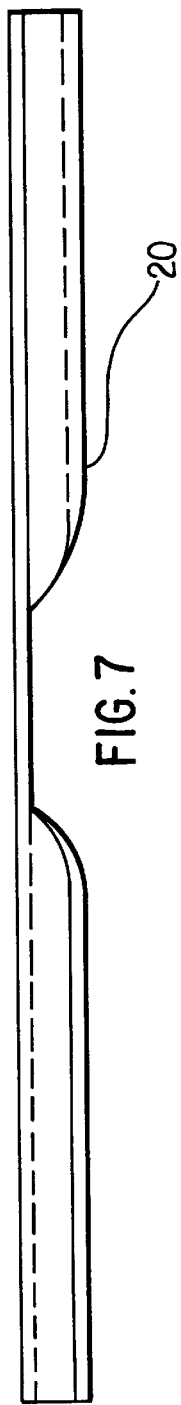
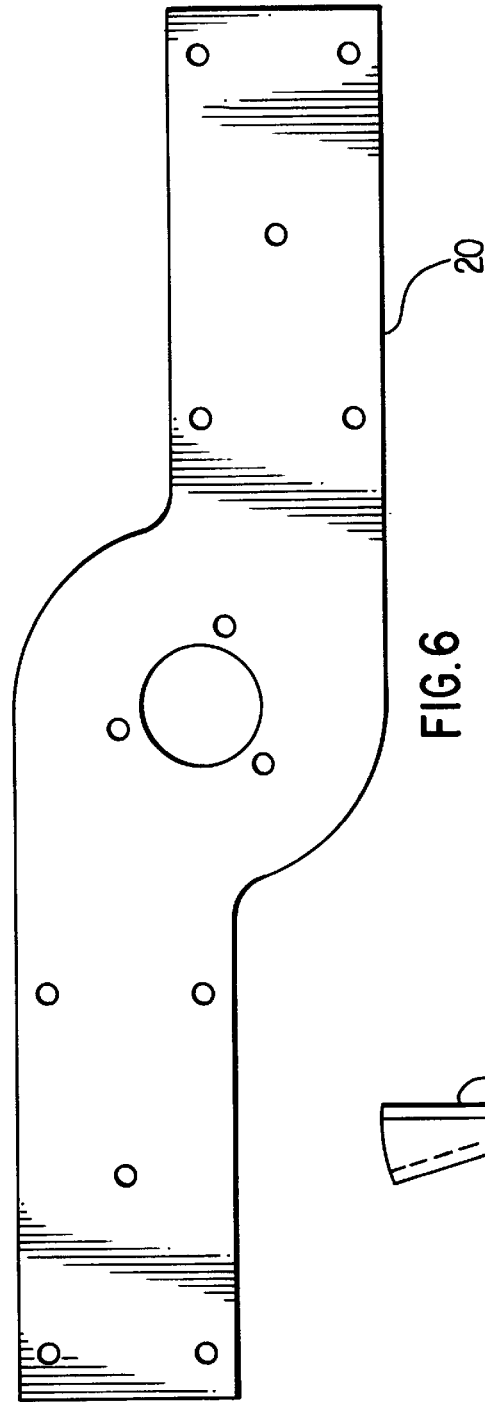
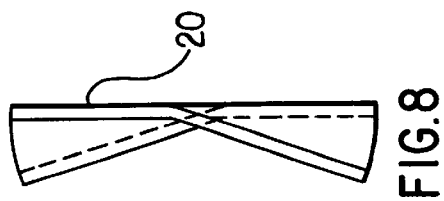
FIG. 7
FIG. 6
FIG. 8

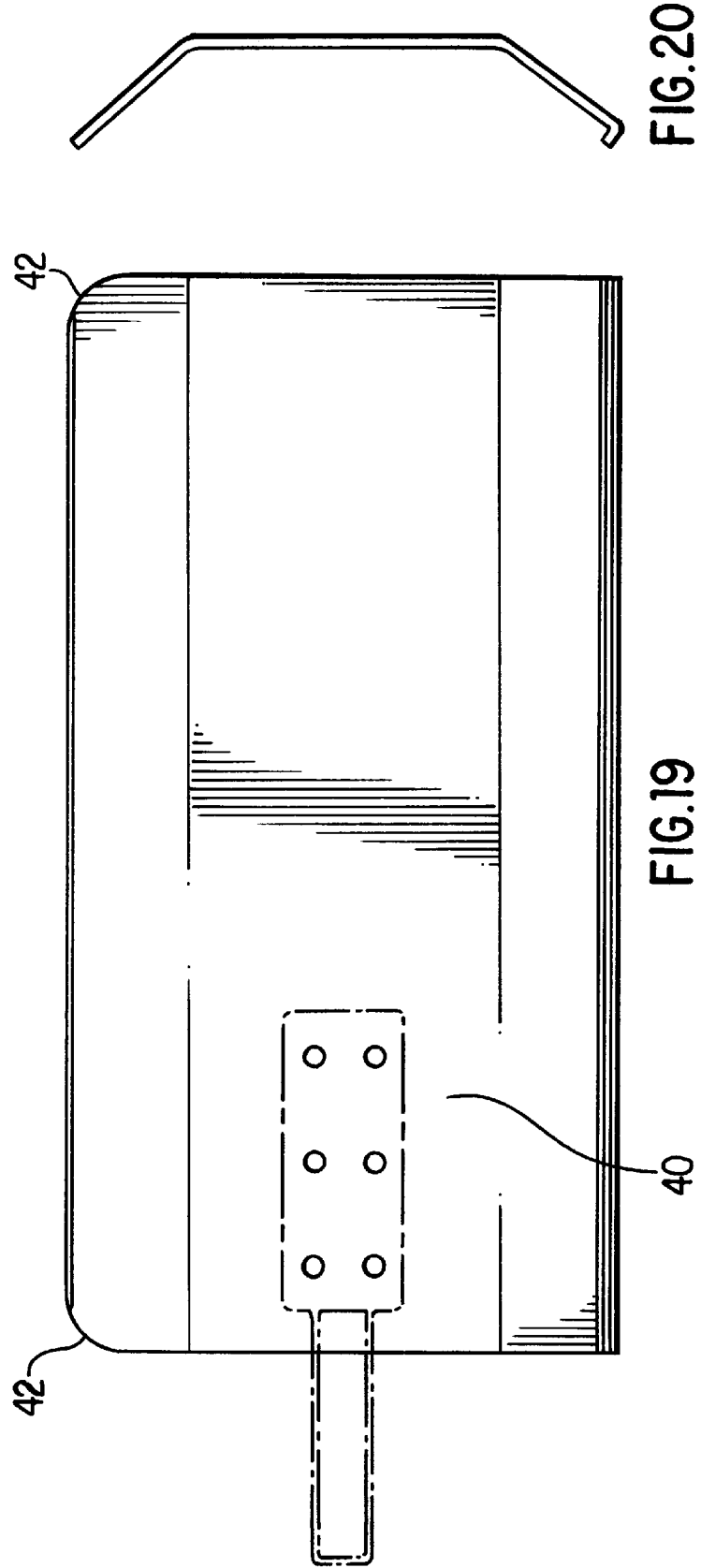

THE BERNOULLI STYLE AIRFOIL

BERNOULLI

WITHOUT GROUND EFFECT   WITH GROUND EFFECT

WINDTUNNEL TESTS
COMPARING VARIUS STANDARD AIR FOILS WITH MAF AIR FOIL DESIGNS 3, 4 & 5

| AIR FOIL DESCRIPTION/SHAPE | TEST SPECIMEN # | WIDTH (NOTE: ALL SPECIMENS WERE 12" LONG) | MAX. LIFT ANGLE OF ATTACK | POUND OF LIFT @ ~19 MPH | POUND OF LIFT @ ~30 MPH | REMARKS |
|---|---|---|---|---|---|---|
| ORDINARY AIRFOIL CARVED FROM BALSAWOOD | 1 | 4" | 22° | 0.70 | 1.65 | |
| FAN BLADE AIRFOIL MOLDED PLASTIC | 5 | 4"@TIP 5 1/2"@ROOT | 28°@TIP 43°@ROOT | 0.65 | 1.60 | |
| MAF-3 AIRFOIL ROLL FORMED BDD BLADE | 2 | 4" | 26° | 0.95 | 2.40 | LESS PEAKED LIFT TO ANGLE OF ATTACK CURVE |
| MAF-7 ROUNDED SHORT CHORD 30° ANGLE | 8 | 4 5/8" | 25° | 0.88 | 2.58 | |
| ORDINARY AIRFOIL W/FLAP MODEL AIRPLANE WING SECTION | 3 | 10" | 28° | 1.75 / 1.35 | 2.80 / 2.30 | FLAP DOWN~35° FLAP UP |
| MAF-4 AIRFOIL FORMED FROM 12 GA. ALUM | 4 | 10" | 29° | 1.90 | 3.55 | |
| MAF-6 AIRFOIL FORMED FROM 12 GA. ALUM | 6 | 8 3/8" | 32° | 2.00 | 3.80 | MUCH FLATTER A OF A CURVE ~7 1/2% DEVIATION FROM 25° TO 45° |
| MAF 7 ROUNDED 30° ANGLE | 7 | 8 3/8" | 29° | | 4.00 | WITH SLOTS 4.2# FLAT A OF A CURVE |
| MAF 7 ROUNDED 30° ANGLE WIDE CHORD | 9 | 9" | 32° | | 4.25 | LIFT OVER 4 Lbs. FROM 23° TO 37° ANGLE OF ATTACK |
| NACA 0012 AIRFOIL BALSAWOOD | 10 | 8 3/8" | 24° | | 1.90 | POPULARLY USED ON WINDMILL BLADES |

FIG. 27

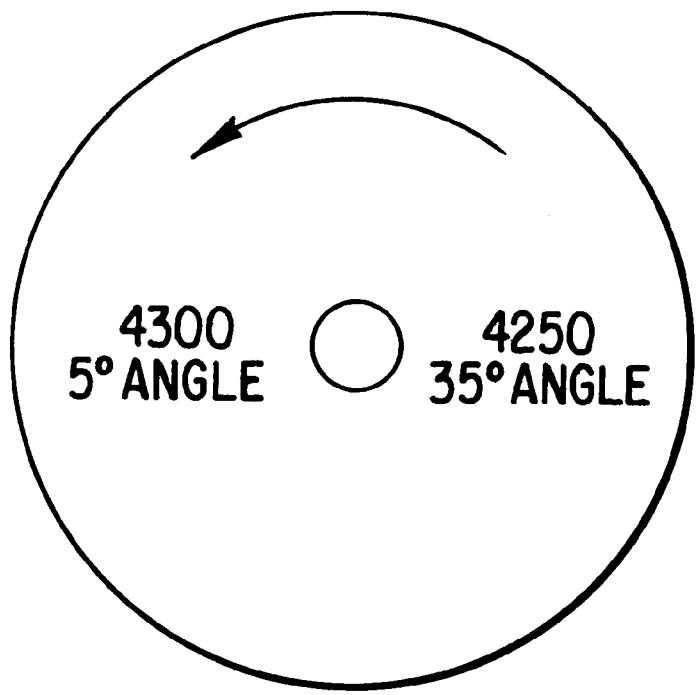
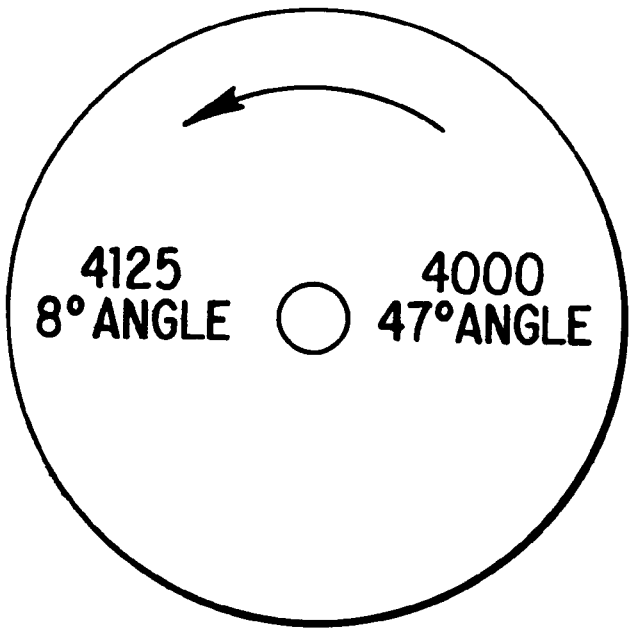
FIG. 29

BLADE DETAILS MF3
WIDTH 4.650 WITH ROOT BENCH
LENGTH 24"
ANGLES 30°
LIP HEIGHT .200

MOTOR DETAILS:
H.P 3/4
RPM 1725
PHASE 3

TEMP 81° F
R.H
DENSITY

| # BLADES | < OF ATTACK | DIM D | DIM E | TIP Cinco | VEL-fpm/cfm | PRESSURE | RPM | AMPS | VOLTS | WATTS | Db |
|---|---|---|---|---|---|---|---|---|---|---|---|
| 3 | 30° | 66" | .500 | .250 | HOR. 1926 1904 / VERT. 1718 1765 | .075"WG | 926 | ① 2.57 ② 2.41 ③ 2.43 | 115 115 120 | | 85 |
| 3 | 30° | 66 | 2.500 | .250 | HOR. 2070 1724 1704 / VERT. 1727 1709 | 1"WG | 929 | ① 2.48 ② 2.38 ③ 2.40 | 115 115 120 | | 85 |

FIG.30

BLADE DETAILS  MF 3 WRB
WIDTH  4.650"
LENGTH  24"
ANGLES  30/30
LIP HEIGHT  .200"

MOTOR DETAILS:
H.P  3/4
RPM  1725
PHASE  3

TEMP  83° F
R.H
DENSITY

| # BLADES | < OF ATTACK | DIM D | DIM E | TIP Cinco | VEL-fpm/cfm | PRESSURE | RPM | AMPS | VOLTS | WATTS | Db |
|---|---|---|---|---|---|---|---|---|---|---|---|
| 3 | 35° | 66" | .500" | .250" | HOR 1990 1947 VERT 1769 1741 | .050"WG | 920 | ①2.66 ②2.44 ③2.63 | ①115 ②115 ③120 | | 86 |
| 3 | 35° | 66" | 2-1/2" | .250" | HOR 1765 1787 VERT 1728 1749 | .050"WG | 926 | ①2.62 ②2.43 ③2.70 | ①115 ②115 ③120 | | 85 |

FIG.31

BLADE DETAILS MF 3 WRB
WIDTH 4.650
LENGTH 24"
ANGLES 30/30
LIP HEIGHT .200

MOTOR DETAILS:
H.P 3/4
RPM 1725
PHASE 3

TEMP 83° F
R.H
DENSITY

| # BLADES | < OF ATTACK | DIM D | DIM E | TIP Cinco | VEL-fpm/cfm | PRESSURE | RPM | AMPS | VOLTS | WATTS | Db |
|---|---|---|---|---|---|---|---|---|---|---|---|
| 3 | 40° | 66" | .500" | .250" | HOR 1907 1996 / VERT 1757 1802 | .050"WG | 920 | ① 2.73 ② 2.65 ③ 2.75 | 115 115 120 | | 84 |
| 3 | 40° | 66" | 2.500" | .250" | HOR 1751 1686 / VERT 1649 1598 | .050"WG | 920 | ① 2.73 ② 2.60 ③ 2.73 | 115 115 120 | | 84 |
| 3 | 20° | 66" | .500" | .250" | HOR 1718 1688 / VERT 1548 1550 | .040" | 933 | ① 2.26 ② 2.23 ③ 2.25 | 115 115 120 | | 84 |

BLADE DETAILS MF 4
WIDTH 4.675
LENGTH 24"
ANGLES 30/30
LIP HEIGHT .125

MOTOR DETAILS:
H.P 3/4
RPM 1725
PHASE 3

TEMP 85°F
R.H
DENSITY

| # BLADES | < OF ATTACK | DIM D | DIM E | TIP Cinco | VEL-fpm/cfm | PRESSURE | RPM | AMPS | VOLTS | WATTS | Db |
|---|---|---|---|---|---|---|---|---|---|---|---|
| 4 | 35° | 66" | .500 | .175 | HOR. 2241 2253 VERT. 2012 1963 | .050 | 912 | ① 2.73 ② 2.71 ③ 2.72 | 115 115 120 | | 88 |
| 4 | 35° | 66" | 2.500 | .175 | HOR. 2061 2017 VERT. 1918 1913 | .050 | 913 | ① 2.77 ② 2.67 ③ 2.77 | 115 115 120 | | 88 |

FIG.34

BLADE DETAILS MF 4
WIDTH 4.675"
LENGTH 24"
ANGLES 30/30
LIP HEIGHT .125

MOTOR DETAILS:
H.P 3/4
RPM 1725
PHASE 3

TEMP 84° F
R.H
DENSITY

| # BLADES | < OF ATTACK | DIM D | DIM E | TIP Cinco | VEL-fpm/cfm | PRESSURE | RPM | AMPS | VOLTS | WATTS | Db |
|---|---|---|---|---|---|---|---|---|---|---|---|
| 4 | 40° | 66" | .500 | .175 | HOR. 2356 2280 VERT. 1994 2056 | .075 | 909 | ① 2.85 ② 2.91 ③ 3.00 | 115 115 120 | | 87 |
| 4 | 40° | 66" | 2.500 | .175 | HOR. 2092 2058 VERT. 1944 1912 | .050 | 911 | ① 2.88 ② 2.94 ③ 2.92 | 115 115 120 | | 87 |

FIG.35

BLADE DETAILS MF 5
WIDTH 4.675"
LENGTH 24"
ANGLES 30/30
LIP HEIGHT .125

MOTOR DETAILS:
H.P 3/4
RPM 1725
PHASE 3

TEMP 74°F
R.H
DENSITY

| # BLADES | < OF ATTACK | DIM D | DIM E | TIP Cinco | VEL-fpm/cfm | PRESSURE | RPM | AMPS | VOLTS | WATTS | Db |
|---|---|---|---|---|---|---|---|---|---|---|---|
| 5 | 30° | 66" | .500" | .225" | HOR. 2366 2281 / VERT. 1958 1944 | .1"WG | 920 | ① 2.90 ② 2.86 ③ 2.95 | 115 115 120 | | 89 |
| 5 | 30° | 66" | 1.680" | .225" | HOR. 2142 2042 / VERT. 1831 1960 | .1"WG | 916 | ① 2.90 ② 2.85 ③ 2.97 | 115 115 120 | | 89 |
| 5 | 30° | 66" | 2.500" | .225" | HOR. 2050 1948 / VERT. 1918 1899 | .1"WG | 916 | ① 2.93 ② 2.85 ③ 3.00 | 115 115 120 | | 89 |

FIG.36

BLADE DETAILS MF 5
WIDTH 4.675"
LENGTH 24"
ANGLES 30/30
LIP HEIGHT .125"

MOTOR DETAILS:
H.P 3/4
RPM 1725
PHASE 3

TEMP 83° F
R.H
DENSITY

| # BLADES | < OF ATTACK | DIM D | DIM E | TIP Cinco | VEL-fpm/cfm | PRESSURE | RPM | AMPS | VOLTS | WATTS | Db |
|---|---|---|---|---|---|---|---|---|---|---|---|
| 5 | 35° | 66" | .500" | .250 | HOR. 2429 2401 / VERT. 2159 2024 | .050" | 906 | ① 2.96 ② 2.96 ③ 3.10 | 115 115 120 | | 89 |
| 5 | 35° | 66" | 2.500" | .250 | HOR. 2171 2057 / VERT. 1840 1985 | .075" | 909 | ① 3.06 ② 2.94 ③ 3.08 | 115 115 120 | | 89 |
| 5 | 35° | 66" | .500" | .250 | HOR. 2541 2496 / VERT. 2250 2050 | .075" | 906 | ① 3.13 ② 3.18 ③ 3.20 | 115 115 120 | | 89 |

FIG.37

BLADE DETAILS LC 4BL
WIDTH
LENGTH 24"
ANGLES
LIP HEIGHT

MOTOR DETAILS:
H.P 3/4
RPM 1725
PHASE 3

TEMP 83° F
R.H
DENSITY

| # BLADES | < OF ATTACK | DIM D | DIM E | TIP Cinco | VEL-fpm/cfm | PRESSURE | RPM | AMPS | VOLTS | WATTS | Db |
|---|---|---|---|---|---|---|---|---|---|---|---|
| 4 | | 66" | .500 | .125 | HOR. 2097 2184 VERT. 1791 1835 | .040 | 920 | ① 2.62 ② 2.55 ③ 2.60 | 115 115 120 | | 85 |
| 4 | | 66" | 2.500 | .125 | HOR. 2042 2042 VERT. 1751 1738 | .040 | 918 | ① 2.56 ② 2.59 ③ 2.58 | 115 115 120 | | 87 |

FIG.38

BLADE DETAILS GH WIGGLE
WIDTH
LENGTH 24"
ANGLES
LIP HEIGHT

MOTOR DETAILS:
H.P 3/4
RPM 1725
PHASE 3

TEMP 83° F
R.H
DENSITY

| # BLADES | < OF ATTACK | DIM D | DIM E | TIP Cinco | VEL-fpm/cfm | PRESSURE | RPM | AMPS | VOLTS | WATTS | Db |
|---|---|---|---|---|---|---|---|---|---|---|---|
| 5 | | 66" | .500 | .250 | HOR. 2130 2168 / VERT. 1923 1892 | .025 | 797 | ① 2.69 ② 2.54 ③ 2.61 | 115 115 120 | | 84 |

FIG.39

BLADE DETAILS GH WIGGLE
LENGTH 24"
WIDTH
ANGLES
LIP HEIGHT

MOTOR DETAILS:
H.P 3/4
RPM 1725
PHASE 3

TEMP 83° F
R.H
DENSITY

| # BLADES | < OF ATTACK | DIM D | DIM E | TIP Cinco | VEL-fpm/cfm | PRESSURE | RPM | AMPS | VOLTS | WATTS | Db |
|---|---|---|---|---|---|---|---|---|---|---|---|
| 5 | | 66" | .500 | .250" | HOR. 2468C 2343H 2291H VERT. 2078 2009 | .040 | 898 | ① 3.27C 3.20H ② 3.28C 3.24H ③ 3.26C 3.17H | 115 115 120 | | 89 |
| 5 | | 66" | 2.500 | .250" | HOR. 2133 2356 VERT. 2060 2058 | .050 | 898 | ① 3.27 ② 3.34 ③ 3.26 | 115 115 120 | | 89 |

FAN BLADE, STRUCTURES AND METHODS

CROSS REFERENCE TO RELATED APPLICATIONS

This application is a continuation-in-part of my prior application Ser. No. 08/685,134 filed Jul. 24, 1996, now U.S. Pat. No. 5,711,653 entitled AIR LIFTED AIRFOIL the disclosure of which is incorporated herein by reference; which was a continuation-in-part of my prior then application Ser. No. 08/507,129 filed Jul. 31, 1995 entitled WIND ENERGY CONVERSION SYSTEM now U.S. Pat. No. 5,599,172 the disclosure of which is also incorporated herein by reference. This application is also a continuation-in-part of my prior co-pending application Ser. No. 08/990,201, filed Dec. 13, 1997 entitled AIR FOIL STRUCTURES AND METHOD the disclosure of which is incorporated herein by reference.

TECHNICAL FIELD

This invention relates to improvements in fan blades and fans, and more particularly, to the aerodynamic shape of a fan blade to exhibit improved air movement characteristics.

BACKGROUND ART

In the prior art, a wide variety of shapes have been used to harness the power of air. See, for example, the schematic prior art drawings shown in FIGS. 1A–1D. These shapes are designed primarily to act in response to air flowing in the direction of the arrow identified as "air flow" in FIGS. 1–3, impacting upon the angle of attack at which the airfoil blade is mounted, and causing the blade to lift. In a typical airplane wing (airfoil), for example, the angle of attack is such that a negative pressure is created above the wing (blade or airfoil) and the wing rises as the air flows across it.

In my prior art U.S. Pat. No. 4,655,122, I disclosed an improved aerodynamic shape which comprised essentially a planar face portion and leading and trailing edges associated with opposing ends of the face portion in a pan-shaped enclosure shown more particularly in the detailed cross section of FIG. 4 of that patent. This blade was shown in use in an air damper where one or more blades were pivoted for rotation within a frame. In that environment, the blades provided an increased lift when forced to open by escaping air from a structure, and thus this permitted the blades to be constructed of a relatively heavy gauge material without compromising damper efficiency. The air flow patterns and dimensions are also disclosed in detail.

It became apparent to me that the preferred blade structure had characteristics which were not known in the prior art.

DISCLOSURE OF THE INVENTION

SUMMARY OF THE INVENTION

I have invented an aerodynamic-shape for a fan blade comprising a structure having a cross-section shape comprising an intermediary portion and leading and trailing edges associated with opposite edges of the intermediary portion to form an essentially pan-shaped structure in cross-section with convex and concave surfaces; and having a flange extending from the trailing edge back toward the leading edge in the concave area. The leading edge is defined by the edge which is directed into the air.

BRIEF DESCRIPTION OF DRAWINGS

FIGS. 1A–1D are schematic views of various prior art cross-sections of airfoils;

FIG. 6 is a detail of a portion of the assembly shown in FIG. 5;

FIG. 7 is a side view of the structure shown in FIG. 6;

FIG. 8 is an end view of the structure shown in FIG. 6;

FIG. 19 is an alternate embodiment of a fan blade and plate and stud assembly for use in one of the arrangements depicted in FIG. 18;

FIG. 20 is an end view of the blade shown in FIG. 19;

FIG. 27 is a chart comparing airfoils in wind tunnel tests;

FIG. 29 shows a graphical comparison of the device shown in FIG. 3 as a performance diagram comparing the McCable AIRFOIL (MAF) with another airfoil identified as GREENHECK; and FIGS. 30 through 40 are reports of various tests on the fan blade shown diagrammatically thereon.

DESCRIPTION OF THE PREFERRED EMBODIMENTS

Figure 2:
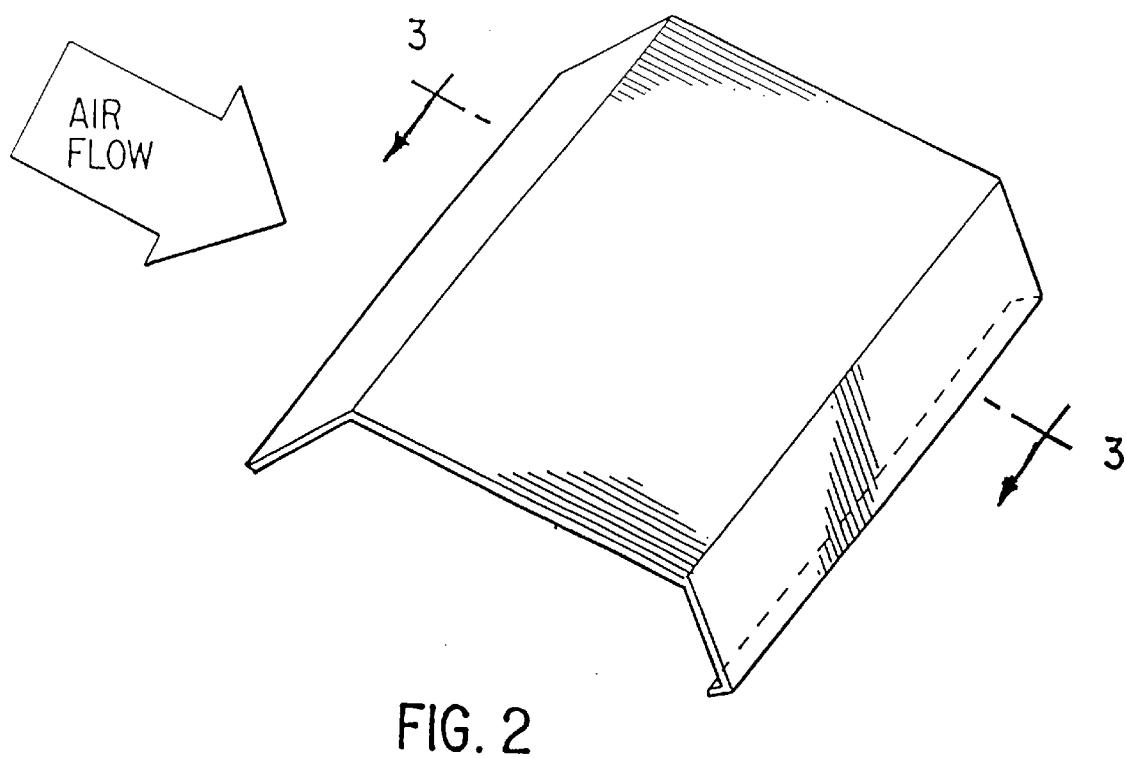
FIG. 2 is a perspective view of a portion of a preferred embodiment of my invention.

Referring to the Figures, FIG. 2 shows a perspective view of a portion of an airfoil or fan blade in accordance with my invention.

Figure 3:
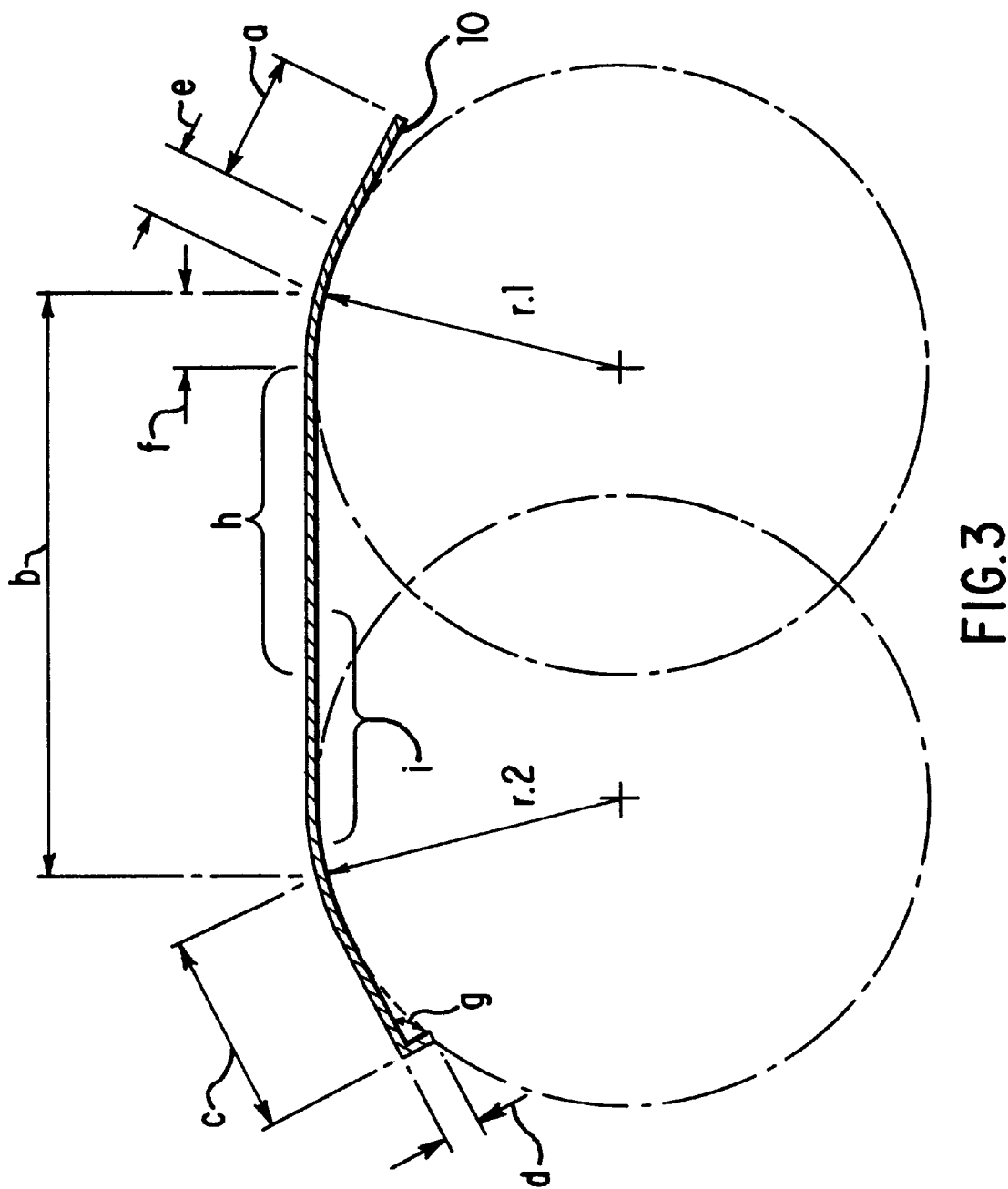
FIG. 3 is a cross-sectional view of a device in accordance with another preferred embodiment of any invention, modified from the device shown in FIG. 2 taken as indicated by the lines and arrows 3—3 in FIG. 2.

Referring now to FIGS. 2 and 3, I will describe in detail the portion of the fan blade 10. As an example of the exact measurement and construction of this blade for use in a fan, the dimensions are as follows: the leading edge, a=0.750"; the intermediate planar portion, b=2.862"; the trailing edge, c=1.031"; the flange, d=0.200"; the radius r.1 is 1.500°; the radius r.2 is 1.500°; and angle g is 90°.

The cross-sectional shape of this blade shows that it comprises essentially a planar intermediate face portion "b" and leading "a" and trailing "c" edges associated with opposite longitudinal edges of said intermediate portion, such that the cross-sectional shape is pan-shaped having concave and convex surfaces; with a flange "d" extending from the trailing edge "c" back toward the leading edge "a" in the concave area.

The difference between the blade shown in section in FIG. 2, as disclosed in my prior co-pending applications, and the modification shown in this application, is that the sharp edges, as shown in FIG. 2, have been modified by slightly rounded transitional areas between the leading edge and the intermediate face portion and the trailing edge in the intermediate face portion. These curvatures as shown by the radii r.1 and r.2. The rounded portions may take up a combined distance of half an inch as shown by the quarter inch dimensions at e and f.

This blade is preferably mounted so that as the fan rotates, the leading edge "a" impinges first on the air.

It is theorized that my improved airfoil structure has the following advantages over the prior art. The leading edge portion splits and aligns the relative wind with an essentially flat intermediate portion and with the lubricating film and mass angle increase of deflected air affecting the trailing portion. This may be understood by reference to FIG. 3. The functions of the portions are as follows:

The leading edge portion "a" sets up relative wind direction (angle) and splits air flow for:

a. Outer apportionment (above the convex surface) for static versus dynamic differential pressure force component; and
  b. Inner apportionment (proximate to the concave surface) for impulse/impact differential pressure force component.

In the Bernoulli portion "e" and "f", the outer curve sets up upper faster flow versus lower slower flow for relative static pressure differential.

The central (flat) portion "b" has two components. The component "h" carries on the velocity static work and the inner portion "i" begins the impact work.

Portion "c" is the trailing portion. The trailing edge lip "d" dams up a lubricating film of relatively static air that reduces drag and more efficiently deflects a greater mass of air at a larger deflection angle to maximize impact action/reaction.

It is theorized that the preferred blade shape and positioning captures air rather than let it pass freely through the apparatus. This has several effects. First, it causes aerodynamic lift. Secondly, it can trap air and increase the driving force.

Consider Bernoulli and fast moving air—the speeds are different, but the air is doing one more thing—it's not following a straight path; perhaps, thanks in part to cohesion and surface adhesion. Try acceleration of the firmament (air). Like many mass elements, it does not really want to move for free and that is the basis for an improved aerodynamic theory. Understanding that both over the top speeds up and underside impacts/deflects; and that an airfoil is forced through those columns of air faster than they can fall back down on themselves, could contribute towards further expansion of lifting device types—not just better wing shaping, but wholly different modes of obtaining lift from atmospheric pressure.

We are now into thin angled surfaces with minimum curves as wing configurations. What about those kites, sails, hang gliders, ultra lites and some high speed winds that essentially have the same distance for the air to transverse both under and over the surface? The continuous downward curve seems more the trick than faster or slower air—not to deny accelerating the lower (impact) air with smoother more massive (maybe almost passive) under surface flow; and over the top turbulence—anything to help the pressure differential is okay. Transferring the lower surface air onto the upper surface might help. Basically, any way to move the air layer that is on the top surface away from that surface faster than the above column can drop back onto it is the goal—while pumping up or impacting (with less drag) the air under the lifted body. As a wing slows (the rate of air acceleration is still constant) the vertical drop across the wing (angle of attack) must be further. Aerodynamic lift is one of the (few) processes that both prime force elements combine for the total final advantage. The bottom surface compresses and deflects the air down and skis on it (again Newton's first law), while the top surface out accelerates away from the falling upper air. This results in an amplified gain—possibly because lift uses gravity enhanced by time differential inertia directly (converted from differential atmospheric pressure) against its self.

The engine thrust of most airplanes will not hold the plane (going straight) up, but exploitation of aerodynamic lift will allow the engine power to work through another medium and obtain an amplification of the power into the extra lift energy.

The trailing edge flap is an example of the air foil providing a long and continuous air column chase to re-close on itself. Shaping a surface to continually increase its curvature (sometimes a wave shape) further away from the accelerating air column gains more lift. Apply Bernoulli's concept of a curved surface increasing the distance and therefore the speed of separated air flow is substantially different from thinking of a curved surfaced that provides an inertially based constantly dynamic void (lower pressure) from an accelerating air mass. The designing for inertialized aerodynamic force differentials would permit vastly different devices other than wings.

Ground effect has been somehow accommodated as an unexplained insufficiency of Bernoulli's principle, without suspicion. It seems the accelerating (against its own inertia) deflected air column has sufficient conducting to the adjacent air that its rate of acceleration can be slowed. Normally, in large air space, this would be a constant, but proximity of the lift device to the other surfaces, particularly the ground, can alter the air motion. If the air adjacent to the accelerating column is less free to be dragged down, it can slow the closing process producing more pressure differential. Air has some body by self attraction. An air (or water) jet becomes noticeably more transmitted back to the nozzle holder as it is pushed closer to a surface. So it is with ground effect.

Figure 26A:
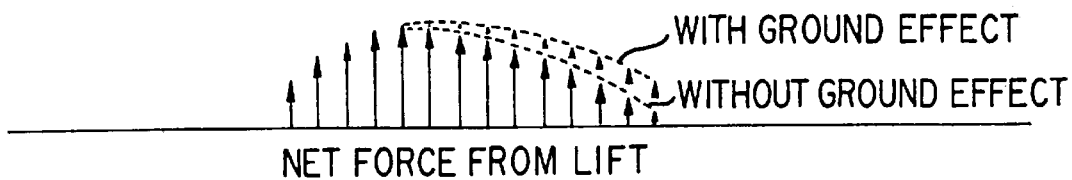
FIGS. 26A, 26B and 26C are showing Bernoulli effects.
Figure 26B:
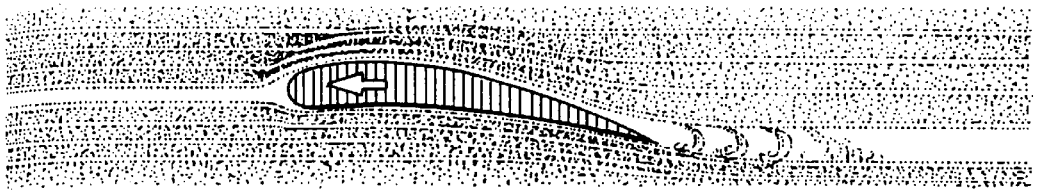
Figure 26C:
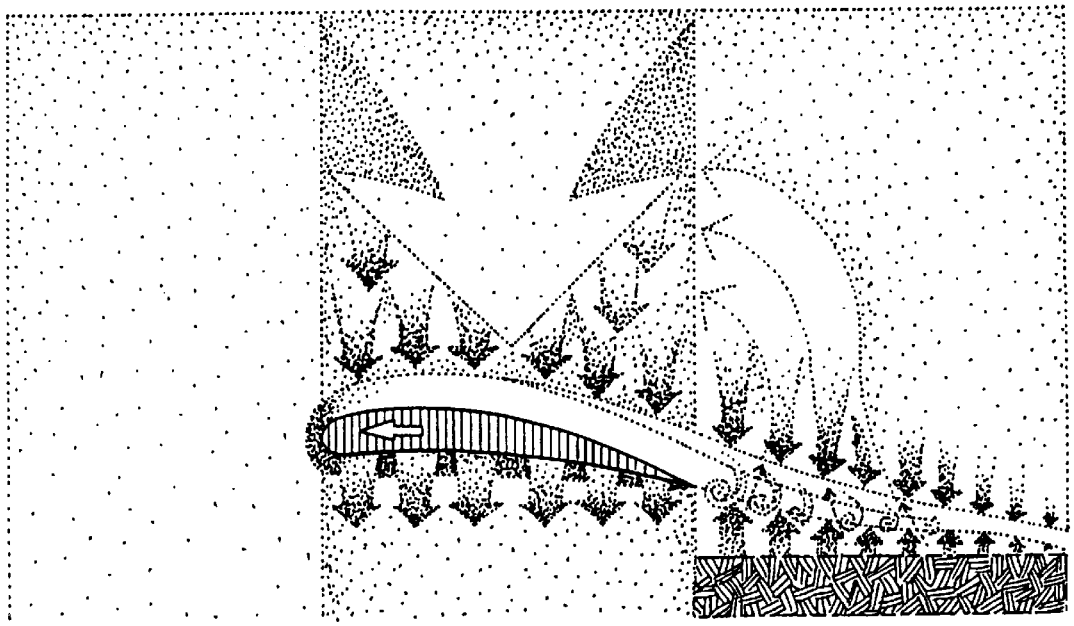

See the representations in FIG. 26 showing Bernoulli effects on airfoils.

A number of prior art blade shapes, as shown by the shapes illustrated schematically in FIGS. 1A through 1D were tested using a wind tunnel. See Windtunnel Tests, FIG. 27. The blades shown from the top are: blade 1A, an ordinary airfoil carved from balsa wood in the shape used by NACA (the predecessor of NASA) for lower speed aircraft (such as gliders or model airplanes) to provide the highest lift known; a fan blade airfoil made of plastic, 1B; an airfoil blade of the type shown in U.S. Pat. No. 4,655,122, 1C; and an airfoil with a flap at the back (also per NACA) as shown in 1D.

Experiments focused on the torque enhancement from air flow inducement provided by windmills and blades or "air dams" which were designed to harness the most force possible from a given air flow. Blades were selected for their ability to maximize force. Tests were conducted to establish a relationship between air mass flow and volume stored under pressure (density). The object was to determine the spacing and fluid flow interaction between blades which would yield the most force, thus determining the number of blades to be used in a windmill. For preliminary testing, it was decided to use fourteen blades in an eight foot windmill. A total of seventeen blade prototypes were made and tested. The drawings, FIGS. 1A through 1D each show a representative sample of a prior art blade cross-sectional configuration. FIGS. 2 and 3 show my invention, which was also tested.

While what I have described in my prior applications has been described in connection with a windmill application, it should be apparent that what I have invented is a blade whose shape produces lift which can be used in a propeller or impeller or fan. I believe the propeller/impeller blades can be enhanced by a tapered shape and by transitioning from the slower (wind mill air speed range) shape at the hub to a flatter angled pan-shape with shorter forward facing trailing edge flanges at the (faster moving) tips. This aerodynamic shape builds up pressure underneath rather than relying on negative pressure on the top, because, I theorize, the air is dammed up within the blade envelope.

In the prior art, for example, the ordinary airfoil can be initially mounted with an angle of attack which goes from 15° to 26° and thereafter "stalls" (that is, begins upper surface separation and turbulence). With this blade shape, it is possible to start lower and go further, i.e., 7° to 45°. Further, in the prior art, if one were to plot lift versus angle of attack, the curve past 26° would ordinarily drop off. With my blade, the curve is essentially a flat curve. I have observed that there is as little as 7½% deviation from 15° to 45°.

In further tests of the newest flatter pan-shaped blade with rounded transitional edges, as shown in FIG. 3 rather than the sharp edges shown in FIG. 2, the flat range was approximately 12°–40° angle of attack to the relative wind.

Also in accordance with my invention, it is conceivable that the rounded portions can be hinged.

Figure 28:
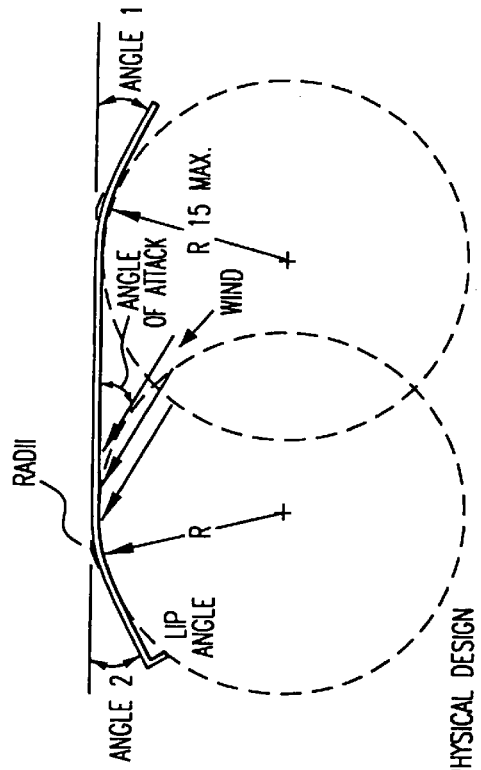
FIG. 28 is a chart showing performance data under wind tunnel tests taken under various conditions.
Figure 32:
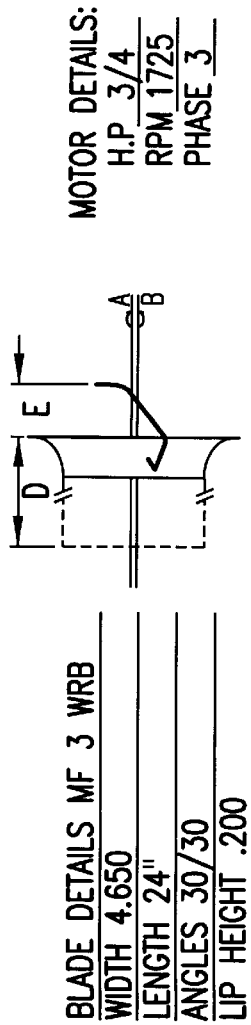
Figure 33:
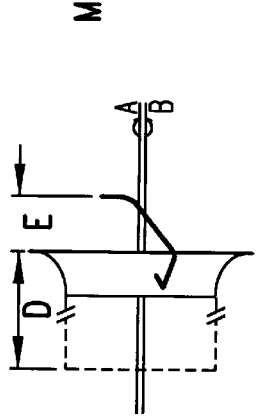

I have set out in detail in my prior application the performance assessment of my wind energy unit in comparative wind tunnel tests. Additional wind tunnel tests are shown on the chart FIG. 28 of the performance data taken under various conditions for the device shown in FIG. 3.

My airfoil design introduces an air mass acceleration and directional efficiency enhancement to air flow causing devices. This improved flow energy gain comes from a simple economic rectangular blade that has a constant radial angle of attack. This volumetric advantage is allowed owing to a wider aerodynamic lift range—i.e., it has a much flatter and longer lift-angle of attack curve. Lift over drag is higher primarily because a lubricating air film is established in the area of maximum air deflection work (up to 40% of mach—which fan tip speeds sometimes exceed). Most air motion energy inducement is from underside management as opposed to Bernoulli/Venturi) over the top activity—which in fans is more a speed inertial warp differential basis than lift.

My fan blade is similar in appearance to the windmill foil, but is very different in action. Because of the higher speeds of revolutions per minute (rpms) a fan produces, there are no endcaps on the fan. When in motion, the blade draws air into the tips enhancing the total flow of the fan. Angle of attack is not so important. A range was found from 15° of attack to 40° of attack. Performance stays the same, but there is an rpm difference. 40° turns less rpm than 15°. Over all, the fan spins slower than all the prior art fans, producing more flow in cubic feet per minute (cpm) and less noise. Also, the fan produces a huge amount of thrust which no one is using in the fan business. Most fan companies put their fan inside a venturi-shaped bell mouth with an exterior louver attached. With the power on, the fan spins and builds up a pressure between the fan and the louver blades. The bell mouth is needed at this point to keep the pressurized air in this space. As the pressure builds, the blades of the louver open to vent pressure. But gravity wants to shut them, so an equilibrium is reached where pressure opens the blades to the point where the fan can produce. This is not fully open and the fan is taxed to not only move air, but also to make pressure to open louvers so air can move. My fan box uses thrust from the fan which is not normally used to open the louvers fully. There is no bell mouth to restrict fan tips from breathing, and fan flow is considerably increased. Also, my fan box has a linkage bar geometry which holds closure pressure on the blades to reduce rattling.

FIGS. 4, 5, 6, 7 and 8 show a fan and damper assembly. The following chart shows the test results from this structure.

The above describes the exhaust assembly where the motor climbs the inclined plane away from the plane of the damper during fan rotation. There is an intake air version where the motor climbs the inclined plane towards the plane of the damper during fan rotation. When the fan is turned off, the thrust dies off and gravity returns the motor to the starting point; closing the damper in both intake and exhaust versions.

| # of Blades | Fan Type | Angle of Attack | FPM | Avg. FRM | Area | CFM | RPM | AMPS Legs 123 | | Volt. AC | Watts | CFM Per Watt | Fan Dia. | Louver Size | Notes |
|---|---|---|---|---|---|---|---|---|---|---|---|---|---|---|---|
| 2 | MAF | 20° | 1.717 | 1.762 | 5.08 | 8.954 | 1140 | 1.98 | 2.09 | 215 | 439 | 20.39 | 24" | Cold | 10/27/97 |
|  | Hand made blades |  | 1.801 |  |  |  |  | 1.95 |  |  |  |  |  | Motor | Sunny 68° F. |
|  | 20° 30° ½ HP motor |  | 1.770 |  |  |  |  | 2.20 |  |  |  |  |  |  |  |
|  | LE TE |  |  |  |  |  |  |  |  |  |  |  |  |  |  |

-continued

| # of Blades | Fan Type | Angle of Attack | FPM | Avg. FRM | Area | CFM | RPM | AMPS Legs 1 2 3 | Volt. AC | Watts | CFM Per Watt | Fan Dia. | Louver Size | Notes |
|---|---|---|---|---|---|---|---|---|---|---|---|---|---|---|
| 2 | MAF Hand made blades 20° 30° ½ HP motor LE TE | | 1.783 1.782 1.791 | 1.785 | 5.08 | 9.067 | 1140 | 2.18 1.90 1.95 | 2.01 | 215 | 432 | 20.99 | 24" | After 3 Min. Running | 10/27/97 Sunny 68° F. |
| 2 | MAF ⅓ HP Daton motor New extrusion | 15° | 1.635 1.657 1.609 | 1.633 | 5.08 | 8.295 | 1140 | 1.50 1.55 1.65 | 1.56 | 210 | 329 | 25.21 | 24" | | 10/28/97 Sunny 65° F. |
| 2 | MAF ⅓ HP Daton motor New extrusion | 18° | 1.632 1.668 1.636 | 1.645 | 5.08 | 8.358 | 1140 | 1.45 1.60 1.70 | 1.58 | 210 | 332 | 25.17 | 24" | | 10/28/97 Sunny 65° F. |

The ⅓ HP is at 25.21 CFM per watt. The prior art in the AMCA Directory of Agricultural Fans is 14.8 CFM per watt at 6280 CFPM. See the following chart. However actual tests conducted on at least one device shown on this chart revealed that the highest rated unit was not up to one-half of its rating. In my fan damper box apparatus, the proffered rating was achieved.

types of propeller fans powered by electric and pneumatic motors. See also FIGS. 29 through 40. The comparisons bases are: power RPM, Velocity/cfm thrust; number of blades based (of the same diameter) and position in and out of a venturi-shaped shroud. Noise measurements were recorded. Blade angle of attack were varied if permitted by the construction.

PERFORMANCE DATA FOR STRUCTURES SHOWN IN FIG. 4

| Model Size | A Square Dimension | B | C | D Fan Dia. | E Std. | Wall Opening Std. Fan | Wall Opening Wire Guard | Ship Weight | HP | CFM* | Velocity* | CFM/ Watt* |
|---|---|---|---|---|---|---|---|---|---|---|---|---|
| 3824 | 28" | 21¾" | 1¾" | 24" | 8" | 28¼" | 28½" | # | ⅓ | 5165 | 1695 | 15.55 |
| | | | | | | | | | ½ | 5604 | 1785 | 12.97 |
| 3832 | 36" | 21¾" | 1¾" | 32" | 8" | 36¼" | 36½" | # | ½ | # | # | # |
| | | | | | | | | | ¾ | # | # | # |
| 3842 | 46" | 21¾" | 1¾" | 42" | 8" | 46¼" | 46½" | # | ¾ | # | # | # |
| | | | | | | | | | 1 | # | # | # |

*Testing w/Solomat Vane @ 0.125" W.G.

It is theorized that a stagnant film is created which provides lubrication and therefore reduces drag.

Insofar as fan applications are concerned, I have noted that:

1. Aerodynamic blade shaping only has a 25%–30% improvement range possibility over a flat blade.
2. Allowing secondary air into both tips and roots is important in free air fans.
3. When pressure differential (opposing the flow) exists over 0.15" W.G., then shrouding and tight tip clearance must be employed in lesser opposing pressures, no shroud (venturi, etc.) allows more cfm.
4. Air motion versus thrust is a blade design consideration.
5. Relative trailing edge over leading edge rake can reduce centrifugal flow for enhanced secondary air draw into the air flow.
6. Tip shaping blends flow there to reduce energy enervating vortexes.

What follows is a report of various tests of the fan blade, referred to hereinafter as the McCabe Airfoil (MAF) as applied to an air moving device. The tests compare various The velocity measurements were done by a timed traversing of a Solomat 510E, which averaged its own recordings. Thrust was accomplished by mounting the fan motor assembly on three linear rail ball bearing journals and reading a spring pull scale.

Absolute values accuracies are not claimed, but comparison validity is fairly represented.

| Air Pressure Into Motor | FPM | RPM's | Thrust |
|---|---|---|---|
| 20" FLAT SHEET METAL BLADES | | | |
| 13 PSI | 2470 | 1200 | 2 Lb. |
| 25 PSI | 3340 | 1600 | 5 Lb. |
| 41 PSI | 3800 | 2100 | 8 Lb. |
| CROWLEY 6 BLADE 20" FLAT PLATE BLADES | | | |
| | 2000 | 850 | 2 Lb. |
| | 2950 | 1301 | 5 Lb. |
| | 3850 | 1673 | 8 Lb. |
| 2 BLADES 20" FAN EARLY DESIGN 33° SHARP BENDS | | | |
| 11¼ PSI | 2200 | 1075 | 2 Lb. |
| 23 PSI | 3330 | 1525 | 5 Lb. |
| 35 PSI | 3920 | 1775 | 8 Lb. |

| GREENHECK'S 24" (AS SHIPPED) STANDARD COST AIR FOIL (6 BLADES) | | | |
|---|---|---|---|
| RPM's | Air Flow In FPM | Average RPM | db |
| With Their Bell Mouth & Blade Inside Lip of Bell @ 20° 1300 RPM | 1813 | 1300 | 89 |
| With Their Bell Mouth & Blade Spaced Upstream ¾ of Blade - Out of Bell @ 20° OA 1300 RPM | 2083 ☞ Diff. of 270 FPM More | 1300 | 85 |

| GREENHECK'S 24" FAN WITH BLADE TIPS SET TO 30° & 35° (6 BLADES) | | | |
|---|---|---|---|
| Description | Air Flow In FPM | Average RPM | db |
| Inside Bell @ 30° | 2251 | 1250 | ? |
| Outside Bell @ 30° | 2290 | 1250 | ? |
| Inside Bell @ 35° Attack Angle | 2271 | 1250 | ? |
| Outside Bell @ 35° @ Tips | 2237 | 1250 | ? |

| 24" CROWLEY 10 BLADES IN GREENHECK'S FRAME | | | |
|---|---|---|---|
| Description | Average Air Flow In FPM | Average RPM | db |
| Outside Bell | 2018 | 1250 | ? |

| OUR 24" 4 BLADE IN GREENHECK'S FRAME | | | |
|---|---|---|---|
| Description | Average Air Flow In FPM | Average RPM | db |
| Inside Bell @ 30° Attack Angle | 2480 | 1250 | ? |
| Inside Bell @ 40° Attack Angle | 2584 | 1250 | ? |
| No Bell @ 40° | 2946 | 1250 | ? |
| Hybrid @ 34° | 3125 | 1250 | ? |

| 24" FAN TESTS ON GREENHECK'S MOTOR MOUNT & BELL | | | |
|---|---|---|---|
| RPM's | Air Flow In FPM | 3 Phase Amp Draw | db |
| Our 3 Blade @ 30° 950 RPM | 1736/1718/1760 | Leg 1/Leg 2/Leg 3<br>2     2.25    2.5 | 85 |
| Greenheck's 3 Blade @ 30° 950 RPM | 1580/1571/1611 | Leg 1/Leg 2/Leg 3<br>1.875   2.25   2.25 | 84 |
| Our 3 Blade @ 35° 950 RPM | 1931/1787/1807/1834 | Leg 1/Leg 2/Leg 3<br>2.25    2.5    2.5 | 78 |
| Our 3 Blade @ 35° 750 RPM | 1526/1519/1500 | Leg 1/Leg 2/Leg 3<br>1.75   2.125   2.5 | 78 |
| Our 3 Blade @ 35° 975 RPM | 1532/1592/1544 | Leg 1/Leg 2/Leg 3<br>1.875   2.062   2.25 | 79 |

| 24" FAN TESTS ON OUR AIR POWERED JIG | | | | | | |
|---|---|---|---|---|---|---|
| Air Pressure Into Motor | Blade Angle Of Attack | FPM Average | | RPM's | Thrust | Manufacturer's # Blades | Comments |
| 20 PSI | 40° | 1522 | 1535 | 500 | 1.5 Lb. | Our 3 Blade | Our 3 Blade |
| 45 PSI | 40° | 2322 | 2340 | 900 | 5 Lb. | Our 3 Blade | |
| 60 PSI | 40° | 2799 | 2686 | 1075 | 7 Lb. | Our 3 Blade | |
| 70 PSI | 40° | 3068 | 3050 | 1150 | 9 Lb. | Our 3 Blade | |
| 20 PSI | 30° | 1471 | 1522 | 600 | 2 Lb. | Our 3 Blade | |
| 45 PSI | 30° | 2407 | 2547 | 1000 | 6½ Lb. | Our 3 Blade | |
| 60 PSI | 30° | 2880 | 2774 | 1200 | 9 Lb. | Our 3 Blade | |
| 70 PSI | 30° | 3093 | 3169 | 1300 | 10½ Lb. | Our 3 Blade | |
| 20 PSI | 30° | 1428 | | 800 | 2 Lb. | GH 3 Blades | Greenheck |
| 45 PSI | 30° | 2418 | | 1275 | 7 Lb. | GH 3 Blades | 3 Blade |
| 60 PSI | 30° | 2877 | | 150 | 9 Lb. | GH 3 Blades | Air Foil |
| 70 PSI | 30° | 2997 | | 1600 | 11 Lb. | GH 3 Blades | |
| 20 PSI | 30° | 1505 | 1521 | 575 | 1¾ Lb. | GH 6 Blades | Greenheck |
| 45 PSI | 30° | 2311 | 2369 | 925 | 6 Lb. | GH 6 Blades | 6 Blade Air Foil |
| 60 PSI | 30° | 2747 | 2679 | 1100 | 9 Lb. | GH 6 Blades | Note: As delivered |
| 70 PSI | 30° | 2903 | 2959 | 1200 | 10½ Lb. | GH 6 Blades | (No blade* |

-continued

24" FAN TESTS ON OUR AIR POWERED JIG

| Air Pressure Into Motor | Blade Angle Of Attack | FPM Average | | RPM's | Thrust | Manufacturer's # Blades | Comments |
|---|---|---|---|---|---|---|---|
| | | | | | | | Adjustment) 1813 FPM; 1300 RPM 89 db |
| 20 PSI | Blades | 1239 | 1293 | 400 | 1 Lb. | GH 5 WB | Greenheck |
| 45 PSI | Not | 1831 | 1852 | 650 | 5 Lb. | GH 5 WB | 5 Blade |
| 60 PSI | Adjustable | 2118 | 2139 | 800 | 7 Lb. | GH 5 WB | Wiggle |
| 70 PSI | | 2222 | 2215 | 900 | 10 Lb. | GH 5 WB | |
| 20 PSI | Blades | 1366 | 1372 | 600 | 2½ Lb. | | Cook |
| 45 PSI | Not | 2047 | 2172 | 1000 | 7½ Lb. | | 4 Blade |
| 60 PSI | Adjustable | 2384 | 2449 | 1125 | 10 Lb. | | Wiggle |
| 70 PSI | | 2577 | 2565 | 1250 | 13 Lb. | | |

PRESSURE TEST
24" McCABE FAN 4 BLADE IN 6' × 24" DIA.

| Angle of Attack | Bell Mouth In | Bell Mouth Out | Pressure Closed | Pressure Open | Flow (FPM) |
|---|---|---|---|---|---|
| 15° | ✓ | | 1.5" W.G. | .2" W.G. | |
| 15° | | ✓ | 1.55" W.G | .25" W.G. | |
| 20° | ✓ | | 1" W.G. | .25" W.G | |
| 20° | | ✓ | 1.4" W.G. | .3" W.G. | |
| 25° | ✓ | | 1.6" W.G. | .4" W.G. | 2386 |
| 25° | | ✓ | 1.5" W.G. | .4" W.G. | 2412 |
| 30° | ✓ | | 1.7" W.G. | .5" W.G. | 2559 |
| 30° | | ✓ | 1.6" W.G. | .5" W.G. | 2551 |
| 30° | ✓ | | 1.5" W.G. | .4" W.G. | |
| 35° | ✓ | | 1.6" W.G. | .55" W.G. | 2569 |
| 35° | | ✓ | 1.6" W.G. | .5" W.G. | 2530 |

AEROTECH'S 24" MODEL AT24ZC 4 BLADES
Housing Outlet Area 5.24 Ft$^2$; 115 Volts; 225 Watts
AMCA Rating 14.5 cfm/watt
Motor: FM1008 - ⅓ HP - 1075 RPM Rated - No Load

| | | FPM | | | | | |
|---|---|---|---|---|---|---|---|
| Fan ID. | RPM | W/ Aerotech Shutter | W/PHL Shutter | W/No Shutter | CFM | Watts | CFM/ Watts |
| 4 Blades As Shipped | 640 | 346 | | | 1813 | 225 | 8.05 |
| 4 Blades As Shipped | 640 | | 370 | | 1938 | | |
| 4 Blades A2 36° A.A. | 494 | | | 950 | 4978 | | |
| 4 Blades A2 36° A.A. | 386 | 391 | | | 2048 | 195.5 | 10.47 |
| 4 Blades A2 36° A.A. | 575 | | 501 | | 2625 | 195.5 | 13.42 |

-continued

AEROTECH'S 24" MODEL AT24ZC 4 BLADES
Housing Outlet Area 5.24 Ft$^2$; 115 Volts; 225 Watts
AMCA Rating 14.5 cfm/watt
Motor: FM1008 - ⅓ HP - 1075 RPM Rated - No Load

| | | FPM | | | | | |
|---|---|---|---|---|---|---|---|
| Fan ID. | RPM | W/ Aerotech Shutter | W/PHL Shutter | W/No Shutter | CFM | Watts | CFM/ Watts |
| 2 Blades A3 27° A.A. | 550 | | | 620 | 3248 | | |
| 2 Blades A3 27° A.A. | 550 | | 384 | | 2012 | | |
| 2 Blades A3 27° A.A. | 515 | 320 | | | 1676 | | |
| 4 Blades A6 17° A.A. | 670 | | | 787 | 4123 | | |
| 4 Blades A6 17° A.A. | | | 629 | | 3295 | 225 (Est.) | 14.64 |
| 4 Blades A6 | | | | 704 | 3688 | | |
| 4 Blades A6 25° A.A. | | | 354 | | 1854 | | |
| Crowley (6 Blades) | | | | 638 | 3343 | | |
| Crowley (6 Blades) | | | 495 | | 2593 | | |
| Crowley (6 Blades) | | 500 | | | 2620 | | |

| | | | FPM MEASUREMENT @ 9" AND WHOLE 6.08 SQUARE FT. AREA; FAN DIA. 24" | | | | | | | | |
|---|---|---|---|---|---|---|---|---|---|---|---|
| No. Blades | Fan Type | Angle of Attack | FPM | Avg. FPM | Area | CFM | Amps Legs 1,2,3 | Volt. AC | Watts | CFM Per Watt | Louver Size | Notes |
| 2 | Hand made blades 20° 30° LF TE ½ HP | 20° | 1.717 1.801 1.770 1.783 | 1.762 | 3.14 5.08 3.66 3.14 | 5532 8954 6448 5604 | 1.98 1.95 2.20 2.18 | 215 | 439 432 | 12.60 20.39 19.69 12.97 | Cold Motor After fan running | 10/27/97 Sunny 68° F. |
| 2 | Hand made blades ⅓ HP | | 1.782 1.791 | 1.185 | 5.08 3.66 | 9067 6533 | 1.90 1.95 | | | | | |
| | ⅓ HP | | 1.635 | | 3.19 | 5127 | 1.50 | | | 15.58 | | |
| 2 | | 15° | 1.657 1.609 1.632 | 1.633 | 5.08 3.66 3.14 | 8295 5976 5165 | 1.55 1.65 1.45 | 210 | 329 | 25.21 18.16 15.55 | | 10/28/97 Sunny 65° F. |
| 2 | | 18° | 1.668 1.636 | 1.645 | 5.08 3.66 | 8358 6020 | 1.60 1.70 | 210 | 332 | 15.55 25.17 18.13 | | |

| No. Blades | Fan Type | Angles of Attack | Average FPM | CFM | RPM | PSI Into Air Motor | Thrust |
|---|---|---|---|---|---|---|---|
| 5 | Green Heck SBE-1L24 OD | Variable | 1.478 | 4.644 | 863 | 40 PSI | 7½ lb. |
| 2 | MAF extrusion | 20° | 1.606 | 5.046 | 1164 | 20 PSI | 5½ lb. |
| 5 | Green Heck SBE-1L24 OD | Variable | 1.179 | 3.704 | 863 | 40 PSI | 7½ lb. |
| 2 | MAF extrusion | 20° | 1.325 | 4.164 | 1164 | 20 PSI | 5½ lb. |

| | |
|---|---|
| TRADE NAME: | AG FAN |
| MODEL NO.: | 2 BLADE - ⅓ HP MOTOR |
| IMPELLER DIAMETER, IN.: | 24 |
| OUTLET AREA, SQ. FT.: | 3.14159 |
| TEST METHOD PER AMCA STANDARD 210–85, FIG. 15. | |
| CALCULATIONS BASED ON INCOMPRESSIBLE FLOW CONDITIONS: | KP > 0.99 KP = 1 USED THROUGHOUT |
| REMARKS: | AIR PERFORMANCE TEST DAYTON MOTOR 2N879L ⅓ HP 1140 RPM 220/440 V 1.8/.9 AMP 3 PH TESTED AS RECEIVED WITH 6 BLADE SHUTTER |

| RESULTS AT TEST CONDITIONS: | | | | | | | |
|---|---|---|---|---|---|---|---|
| DET | PB | DENSITY | RPM | TP | VP | SP | CFM | AMPS |
| 1 | 29.260 | 0.0737 | 1168 | 0.129 | 0.129 | 0.000 | 4560 | 1.86 |
| 2 | 29.260 | 0.0736 | 1171 | 0.140 | 0.045 | 0.095 | 2701 | 1.83 |
| 3 | 29.260 | 0.0736 | 1171 | 0.159 | 0.034 | 0.125 | 2330 | 1.82 |
| 4 | 29.260 | 0.0736 | 1169 | 0.247 | 0.007 | 0.240 | 1050 | 1.83 |

| RESULTS AT STANDARD AIR DENSITY AND RPM AS RUN: | | | | | |
|---|---|---|---|---|---|
| DET | TP | VP | SP | CFM | AMPS |
| 1 | 0.132 | 0.132 | 0.000 | 4560 | 1.89 |
| 2 | 0.143 | 0.046 | 0.097 | 2701 | 1.86 |
| 3 | 0.162 | 0.034 | 0.127 | 2330 | 1.85 |
| 4 | 0.251 | 0.007 | 0.245 | 1050 | 1.86 |

-continued

| | |
|---|---|
| TRADE NAME: | AG FAN |
| MODEL NO.: | 2 BLADE - ½ HP MOTOR |
| IMPELLER DIAMETER, IN.: | 24 |
| OUTLET AREA, SQ. FT.: | 3.14159 |
| TEST METHOD PER AMCA STANDARD 210–85, FIG. 15. | |
| CALCULATIONS BASED ON INCOMPRESSIBLE FLOW CONDITIONS: | KP > 0.99 KP = 1 USED THROUGHOUT |
| REMARKS: | AIR PERFORMANCE TEST GE MOTOR 5K46LN60325 ½ HP 60 HZ 230/460 V 3 PH 1140 RPM 2.4/1.2 AMP TESTED WITH 6 BLADE SHUTTER |

| RESULTS AT TEST CONDITIONS: | | | | | | | |
|---|---|---|---|---|---|---|---|
| DET | PB | DENSITY | RPM | TP | VP | SP | CFM | AMPS |
| 1 | 29.260 | 0.0738 | 1160 | 0.167 | 0.167 | 0.000 | 5174 | 2.29 |
| 2 | 29.260 | 0.0738 | 1163 | 0.181 | 0.086 | 0.095 | 3709 | 2.23 |
| 3 | 29.260 | 0.0738 | 1165 | 0.184 | 0.064 | 0.120 | 3215 | 2.24 |
| 4 | 29.260 | 0.0738 | 1165 | 0.258 | 0.018 | 0.240 | 1682 | 2.22 |

| RESULTS AT STANDARD AIR DENSITY AND RPM AS RUN: | | | | | |
|---|---|---|---|---|---|
| DET | TP | VP | SP | CFM | AMPS |
| 1 | 0.169 | 0.169 | 0.000 | 5174 | 2.33 |
| 2 | 0.184 | 0.087 | 0.097 | 3709 | 2.27 |
| 3 | 0.187 | 0.065 | 0.122 | 3215 | 2.28 |
| 4 | 0.262 | 0.018 | 0.244 | 1682 | 2.26 |

| CEILING FAN TEST |
| :---: |
| Emerson 1/25 BHP 120 VAC 60 Hz Motor |
| Cat# HF-352 1.09 Amps |

| Emerson 3 Blade 52" | |
| :--- | ---: |
| (Avgerage FPM - Two Tests Each) | |
| 438 FPM | .875 amps |
| 456 FPM | .875 amps |
| MAF 2 Blade 52" 19° Attack Angle | |
| 455 FPM | .875 amps |
| 460 FPM | .875 amps |
| MAF 2 Blade 52" 9° Attack Angle | |
| 482 FPM | .800 amps |
| 488 FPM | .800 amps |

As shown above, my new airfoil design can be modified in a number of ways in terms of its use as a fan blade. For example, as shown in FIGS. 21 through 24, I show a tapered design. In that design, I have noted that the air flow is uniform over the whole length of the blade. In the prior art, I noted that it is only in the last one third of the blade, and thus it is not uniform. For example, in a typical blade, the airfoil would be zero near the center and if it was three miles per hour at the outer tip, it would be approximately six miles per hour at some point intermediate in the center and the tip. This causes, among other things, a noise factor. In addition, at low speeds, my design produces much more air.

Figure 23:
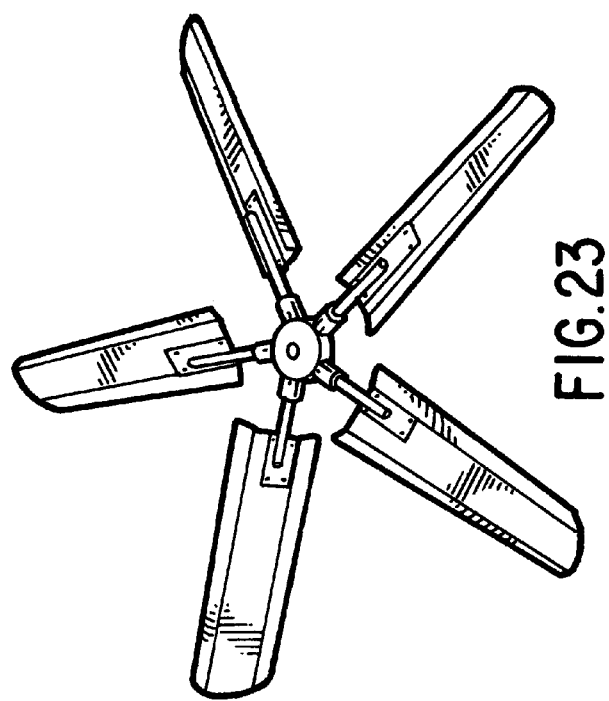
FIG. 23 is a view of a tapered fan blade assembly using five blades each in accordance with a modified form of my invention.
Figure 22:
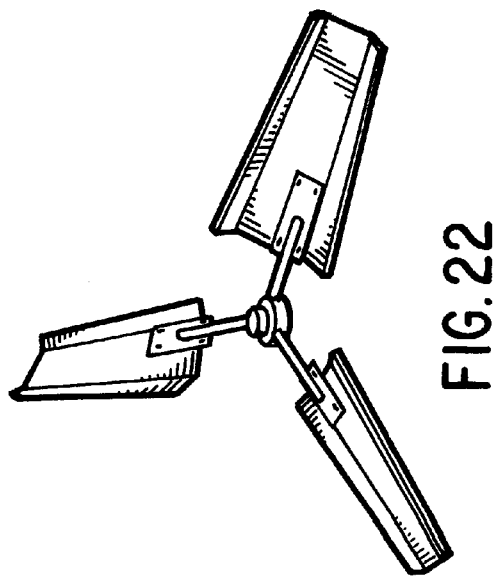
FIG. 22 is a perspective view of a tapered fan blade assembly using three blades.
Figure 24:
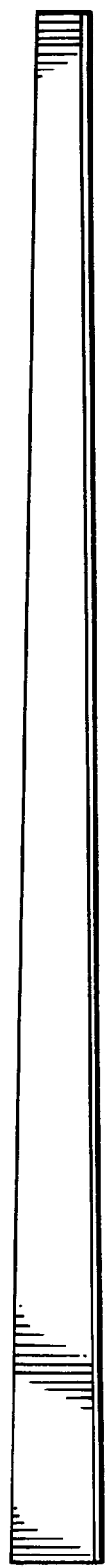
FIGS. 24 and 25 are planar views of a tapered blade in accordance with my invention.

In the design shown in FIG. 23, the tips of the blades are rounded off.

I have also noted that the outer end of the end may be dampered off as an alternative design.

Figure 4:
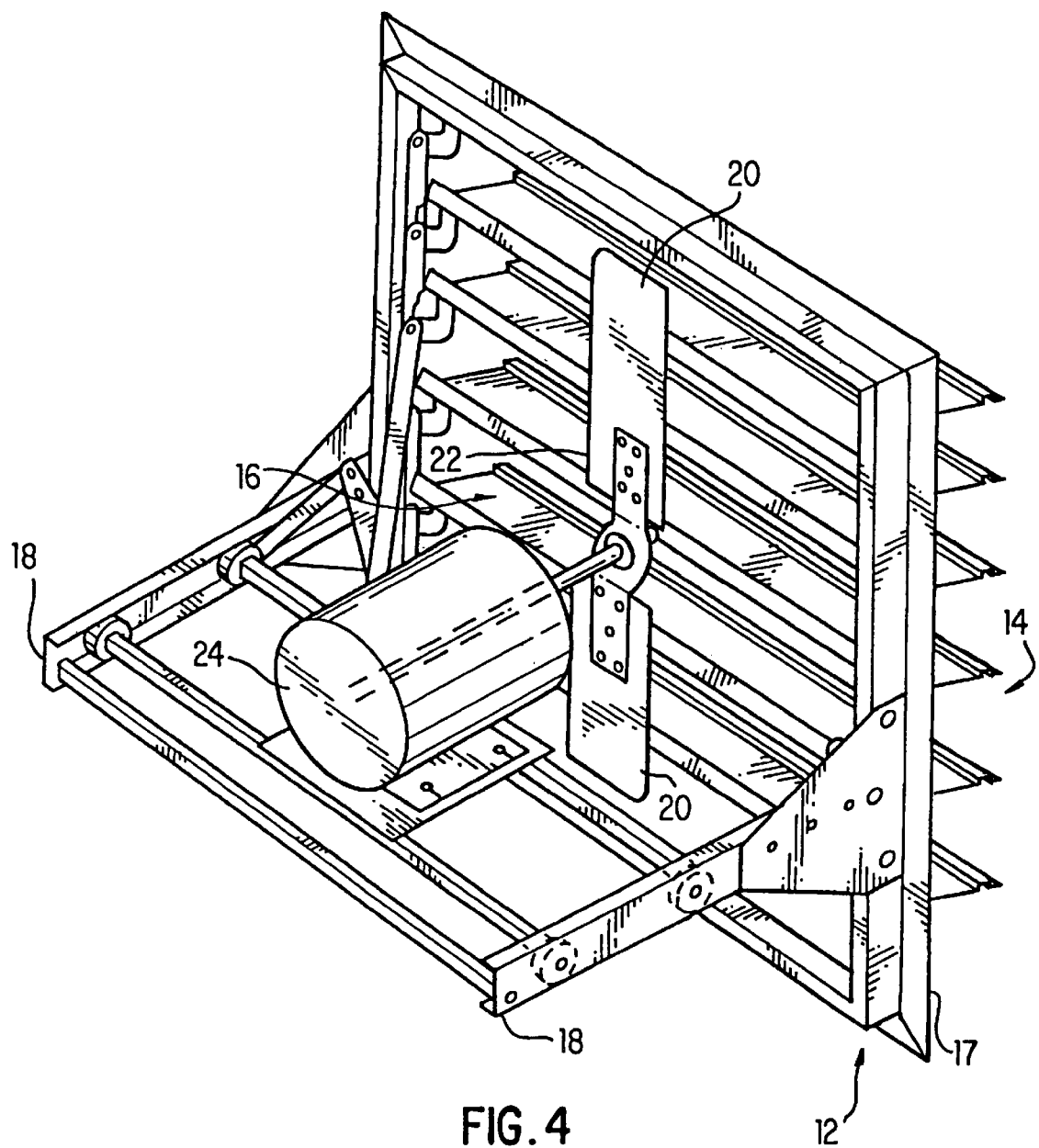
FIG. 4 is a perspective view of a damper fan assembly.
Figure 5:
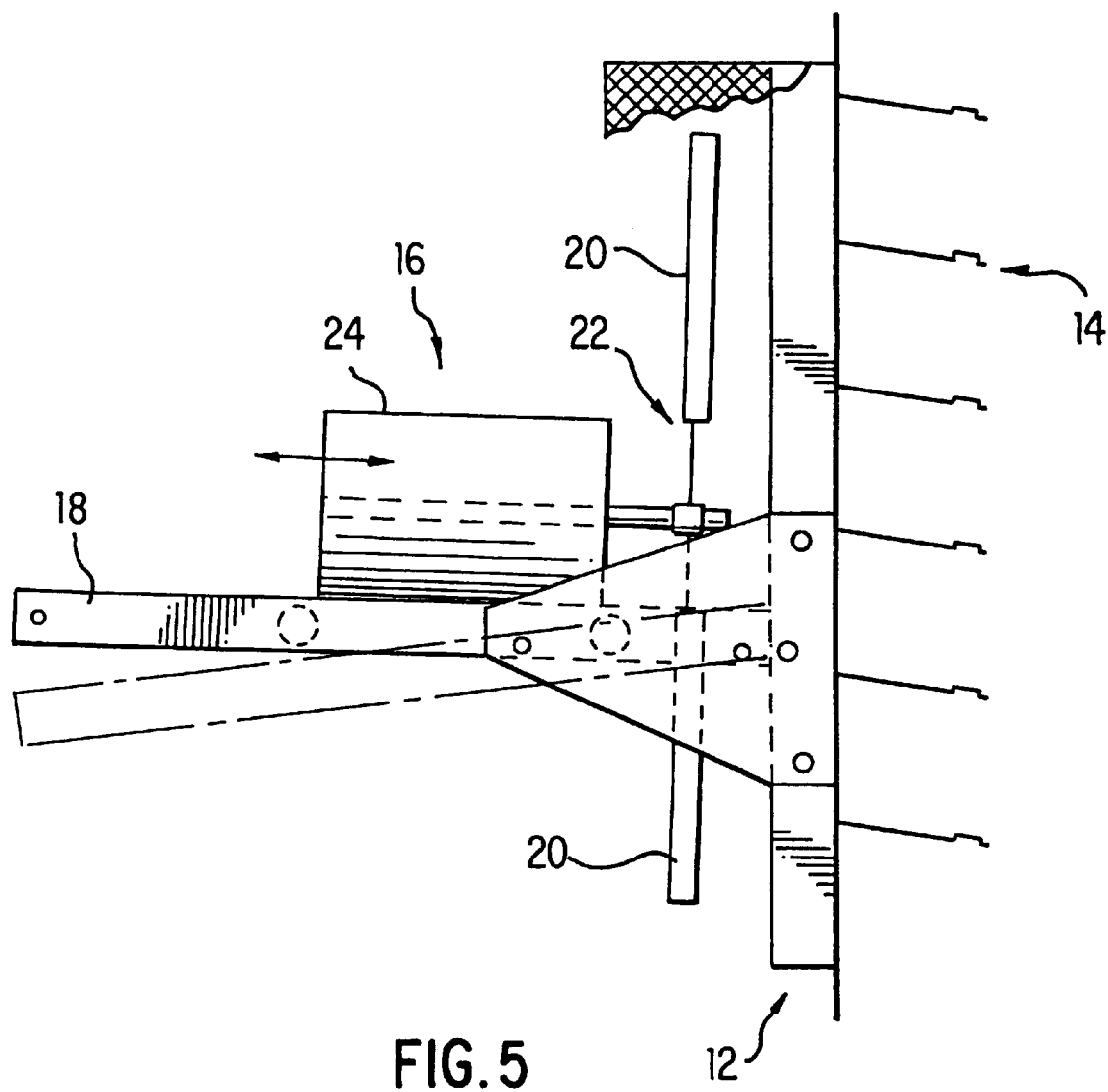
FIG. 5 is a vertical elevation of a damper fan assembly partially broken away to show other elements of the assembly.

I also note that the damper fan assembly, as shown for example in FIG. 4, can be used as both an exhaust fan or a new type fan. Further, it can have optimally two or four blades. In FIG. 4, there is illustrated the exhaust type.

FIG. 4 depicts an apparatus set up for exhausting air through a damper 12. The damper has multiple blades 14 as shown. This apparatus permits the fan and motor assembly 16 to ride on tracks 18 toward and away from the damper frame 17. The blades 20 of the fan 22 are initially positioned within a few inches of the damper blades 14. When the motor 24 is started, it moves along the track away from the plane of the damper blades 14. This movement is caused by the thrust of the air generated by the blades (just like a propeller). In this way, the fan and motor assembly 16 is propelled along the track. Of course, the fan is still acting as a fan, in that it is forcing air out through the damper.

In addition, this mechanism has a series of lever arms connected to the operator which actuates the blades to pivot them between open and closed conditions. Such operators are known in the art. These lever arms force the blades to a fully opened condition in response to the movement of the fan and motor assembly along the track.

Prior art devices did not utilize the thrust of the fan in order to operate the damper. Thus, this device does two things, namely, fully open the damper and move air to exhaust it through the damper.

An intake version of this device can be provided by simply reversing the mounting of the blades on the motor shaft 180°. Note in this regard that the motor need not be reversed in its rotational direction of driving the fan blades. Here again, fan thrust is used both to open the damper and to move air; in this case, drawing air in through the damper.

As shown, the device consists in part of a mounting plate to which the motor is mounted. The plate is welded to rods each of which has rollers on the end, and the rollers are mounted to tracks. The lever arms are pivotally connected to each other and are connected to the rods to open and close the damper upon translative movement of the motor mounting (as will be apparent from a view of the drawings). See, for example, the partially broken away view in FIG. 5. The means for mounting the blades in this configuration consists in part of the hub blank 20, as shown in FIGS. 6, 7 and 8.

Figure 9:
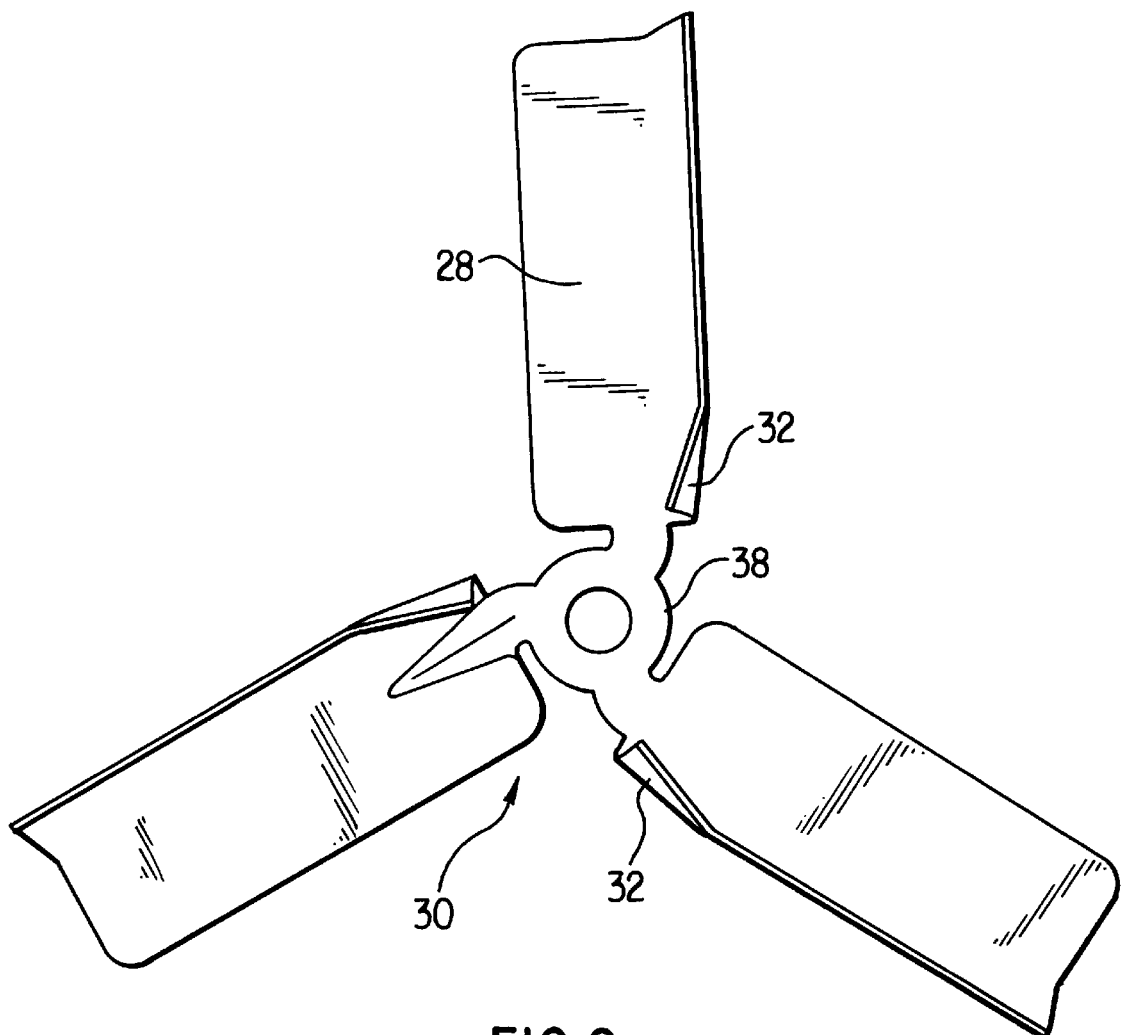
FIG. 9 is a downwind view of another configuration of a multiple blade fan blade assembly in accordance with my invention.
Figure 10:
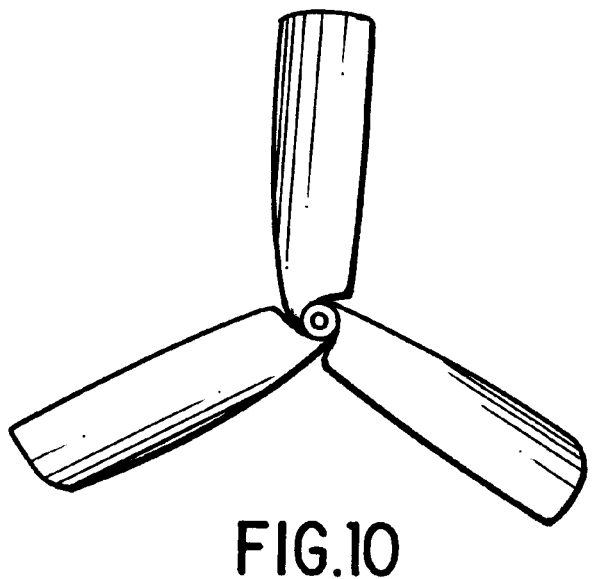
FIG. 10 is an upwind view of the device shown in FIG. 9.
Figure 11:
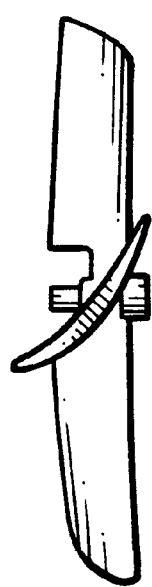
FIG. 11 is a side view showing the ends of the blades of the device shown in FIGS. 9 and 10.
Figure 12:
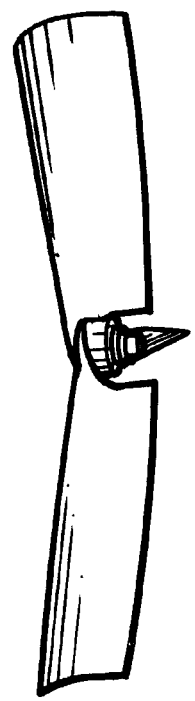
FIG. 12 is a side view of the devices shown in FIGS. 9 and 10 and showing the blades in a different position.
Figures 13, 14:
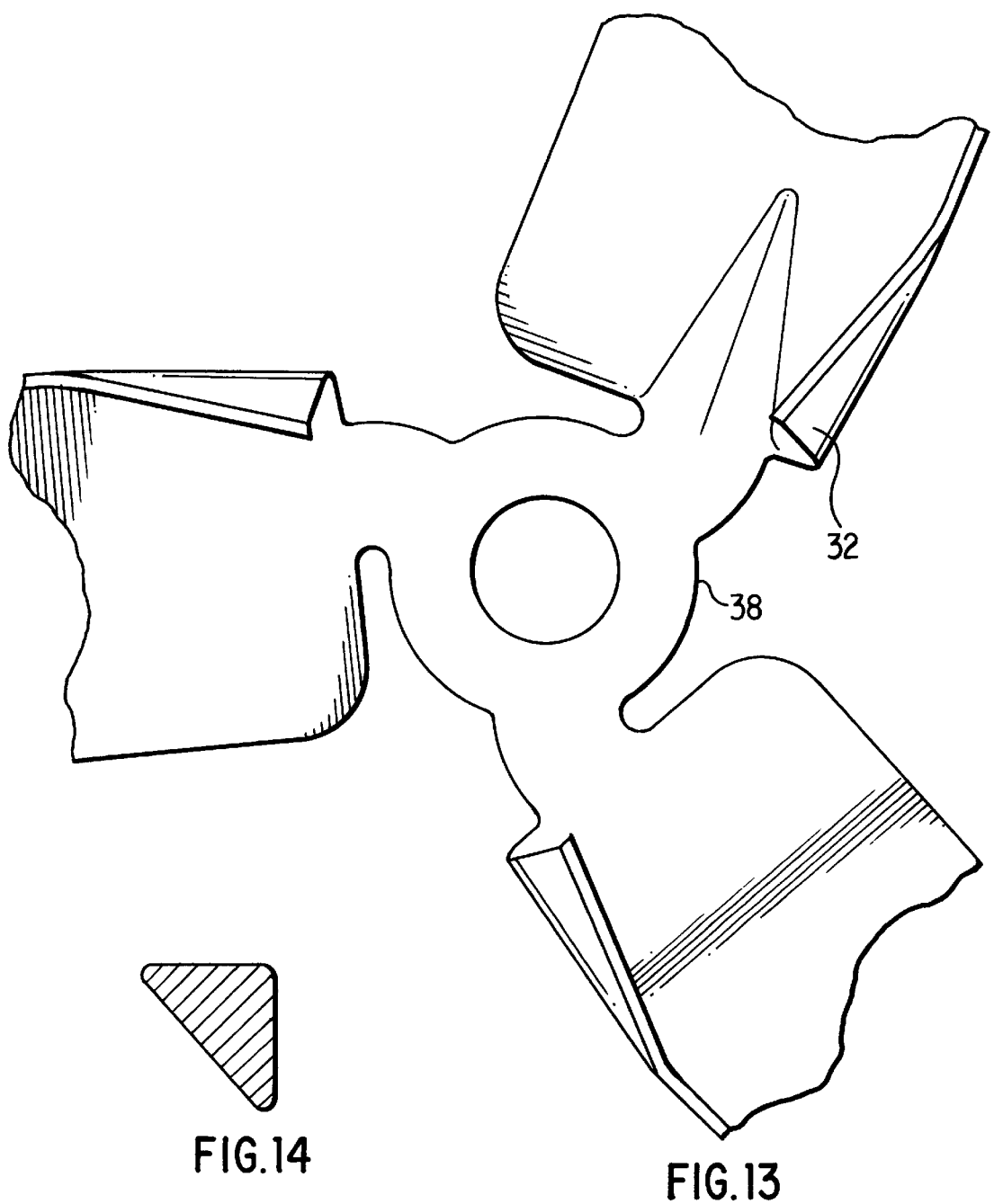
FIG. 13 is a detailed view of the inner hub of the device shown in FIGS. 9 and 10.
FIG. 14 is a cross section of a portion of the device showing the connection between the blade and the hub as shown in FIG. 13.

Other useful fan blade types are shown in the remaining FIGS. 9 through 25. In particular, in FIG. 9, a blade 28 with a curled edge 32 is shown. The curled portion 32 is part of the trailing edge portion of the blade and is located closest to the hub 38 upon which the blades are mounted. See FIGS. 9 through 18. The various mounting means are shown in FIG. 18. One of those consists of a threaded rod 34, as shown. On the other hand, the blade and hub may be molded together and attached by a neck portion which may have a cross-section as shown in FIG. 14.

Figure 15:
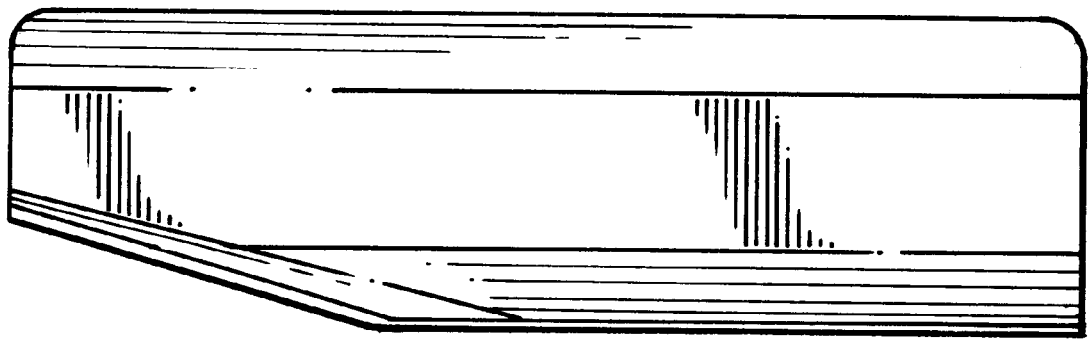
FIG. 15 is a top planar view of the blade in accordance with my invention.
Figure 16:
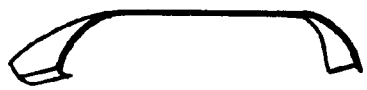
FIG. 16 is an end view of the blade shown in FIG. 15.
Figure 17:
FIG. 17 is a view of a portion of the blade shown in FIG. 15.
Figure 18:
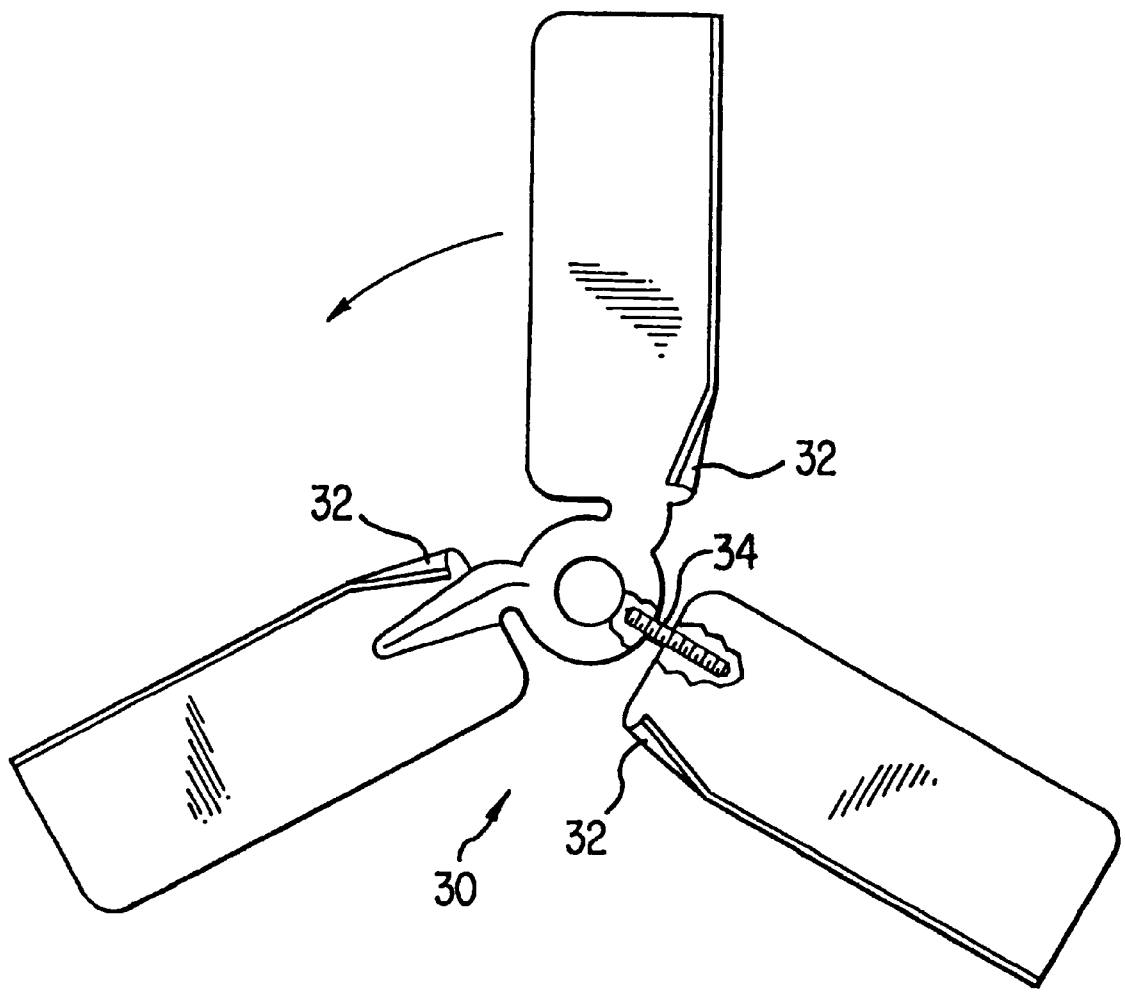
FIG. 18 is a composite view showing alternate methods of attaching blades to a hub.
Figure 21:
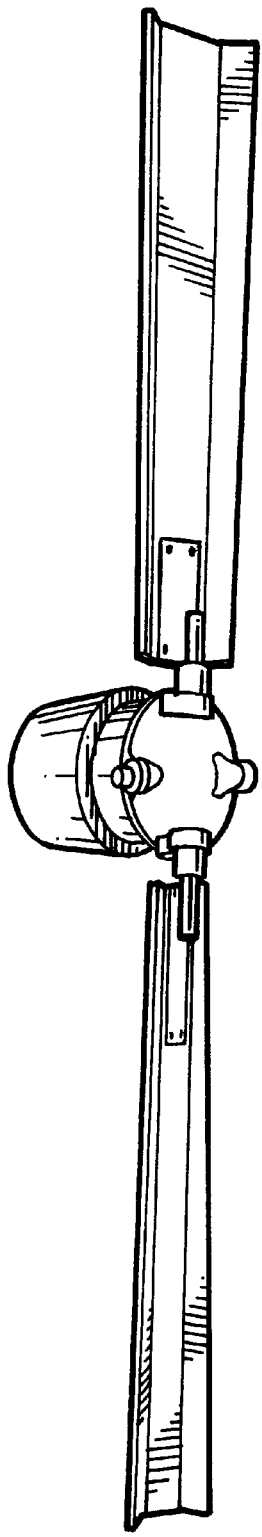
FIG. 21 is a perspective view of a tapered fan blade assembly using two blades.

The details of the curved section of the trailing edge of the blade are shown in FIGS. 15, 16 and 17.

FIG. 19 shows a blade 40 for use in the fan which has rounded corners 42 on the leading edge, as indicated by the half-inch radius. FIG. 20 is an end view.

Figure 25:
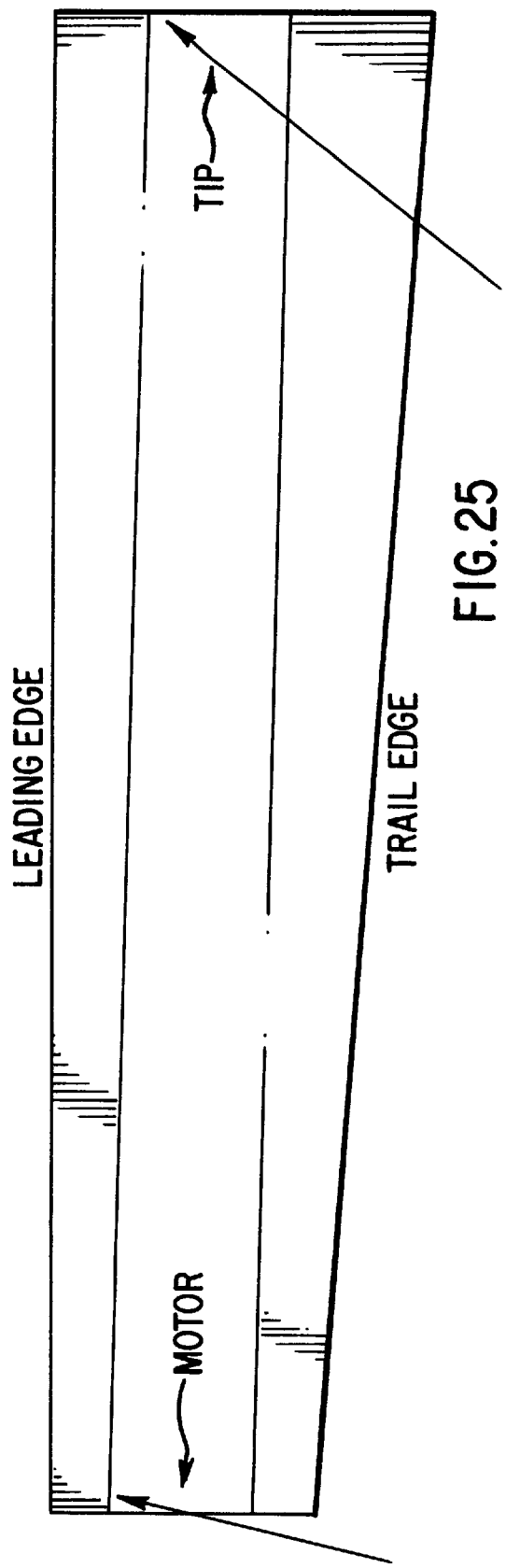

FIGS. 21 through 25 show blades which are tapered from end to end. These may be mounted in pairs or odd numbers as depicted. Typical dimensions are shown in FIG. 25 for the leading and trailing edges as well as the intermediate portion.

What I claim is:

1. An apparatus means for moving air, comprising an apparatus having a plurality of blades, each of said blades having a means for creating a lubricating film of air to reduce drag on the blade when in use in an air stream, each of said blades having a shape comprising an intermediate face portion and leading and trailing longitudinal edge portions associated with opposite edges of the face portion to form, in cross-section, an essentially pan-shaped structure having a convex surface and a concave surface, and further comprising a flange portion extending at an angle of approximately 90 degrees from the trailing edge portion back toward the leading edge portion on the concave side, each blade positioned in said apparatus substantially radially to the direction of moving air flow, said direction of moving air flow being substantially axial to said apparatus.

2. The apparatus means for moving air of claim 1 in which the intermediate face portion, and the leading edge and trailing edge portions are associated along longitudinal areas which are curved in transition between the adjacent surfaces of the respective portions.

3. The apparatus means for moving air of claim 1 wherein the corners of the leading edge portion are curved in plan view.

4. The apparatus means for moving air of claim 1 wherein a portion of the trailing edge is curled over inwardly on the concave side of the blade.

5. The apparatus means for moving air of claim 1 wherein a portion of the trailing edge is curled over inwardly on the concave side of the blade; said blades being mounted on a hub; said portion which is curled over being located proximate to the mounting of the blade on the hub.

6. The apparatus means for moving air of claim 1 wherein each blade is longitudinally tapered.

7. The apparatus means for moving air of claim 1 wherein each blade is longitudinally tapered; said blades being mounted to a hub; and said taper being from a widest area closest to the hub to a narrowest area at the tip most remote from the hub.

8. The apparatus means for moving air of claim 1 in which the blades are mounted on a hub and each blade has a tip remote from the mounting on the hub which tip is curved in plan view.

9. The apparatus means of claim 1 wherein the blades are of substantially uniform thickness.

10. A method of opening and closing a multiple blade damper associated with a motor-driven fan providing thrust upon the operation of the fan, comprising the steps of: movably mounting the fan in proximity to the damper so that the fan can be moved toward and away from the damper; providing and attaching an operator to and between the blades of the damper and the motor-driven fan to move the blades between open and closed positions upon the operation of the fan to provide thrust.

11. The method of claim 10 wherein the blades are of substantially uniform thickness.

12. A method of reducing drag through a fan apparatus comprising providing a plurality of fan blades, each of said fan blades having a shape comprising an intermediate face portion and leading and trailing longitudinal edge portions associated with opposite edges of the face portion to form, in cross-section, an essentially pan-shaped structure having a convex surface and a concave surface, and a flange portion extending at an angle of approximately 90 degrees from the trailing edge portion back toward the leading edge portion on the concave side.

13. The method of claim 2 wherein the blades are of substantially uniform thickness.

* * * * *